United States Patent
Inoue et al.

(10) Patent No.: US 8,260,075 B2
(45) Date of Patent: Sep. 4, 2012

(54) TWO-DIMENSIONAL FILTER ARITHMETIC DEVICE AND METHOD

(75) Inventors: Akihiko Inoue, Fukuoka (JP); Tokuzo Kiyohara, Osaka (JP)

(73) Assignee: Panasonic Corporation, Osaka (JP)

( * ) Notice: Subject to any disclaimer, the term of this patent is extended or adjusted under 35 U.S.C. 154(b) by 644 days.

(21) Appl. No.: 12/097,994

(22) PCT Filed: Nov. 21, 2006

(86) PCT No.: PCT/JP2006/323214
§ 371 (c)(1),
(2), (4) Date: Sep. 30, 2009

(87) PCT Pub. No.: WO2007/072644
PCT Pub. Date: Jun. 28, 2007

(65) Prior Publication Data
US 2010/0046851 A1      Feb. 25, 2010

(30) Foreign Application Priority Data
Dec. 19, 2005   (JP) .................................. 2005-364373

(51) Int. Cl.
    G06K 9/00       (2006.01)
(52) U.S. Cl. ... 382/260; 375/143; 375/152; 375/240.29; 348/290; 348/342; 348/665; 348/835; 386/314; 345/32
(58) Field of Classification Search .................. None
See application file for complete search history.

(56) References Cited

U.S. PATENT DOCUMENTS

| 4,602,285 | A | * | 7/1986 | Beaulier et al. ............... 348/580 |
| 5,289,292 | A | * | 2/1994 | Osada et al. .................. 358/451 |
| 5,410,362 | A |   | 4/1995 | Terada et al. |
| 5,809,182 | A | * | 9/1998 | Ward et al. ..................... 382/298 |
| 7,127,121 | B1 | * | 10/2006 | Pan ............................... 382/260 |

FOREIGN PATENT DOCUMENTS

| JP | 10-304184   | 11/1998 |
| JP | 2002-197454 | 7/2002 |
| JP | 2002-304624 | 10/2002 |

OTHER PUBLICATIONS

International Search Report issued Jan. 16, 2007 in the International (PCT) Application No. PCT/JP2006/323214.

* cited by examiner

*Primary Examiner* — John Lee
(74) *Attorney, Agent, or Firm* — Wenderoth, Lind & Ponack, L.L.P.

(57) ABSTRACT

A two-dimensional filter arithmetic device comprises a picture memory, a line memory, a vertical filtering unit which includes nine first filter modules installed in parallel, a buffer for timing adjustments, and a horizontal filtering unit which includes four second filter modules installed in parallel. From the line memory, the pixel values of nine full pels per line are inputted in parallel to the vertical filtering unit, nine vertically-filtered values of half pels are generated and inputted to the horizontal filtering unit; thereby, four two-dimensionally-filtered values of half pels are generated.

9 Claims, 12 Drawing Sheets

Fig. 7

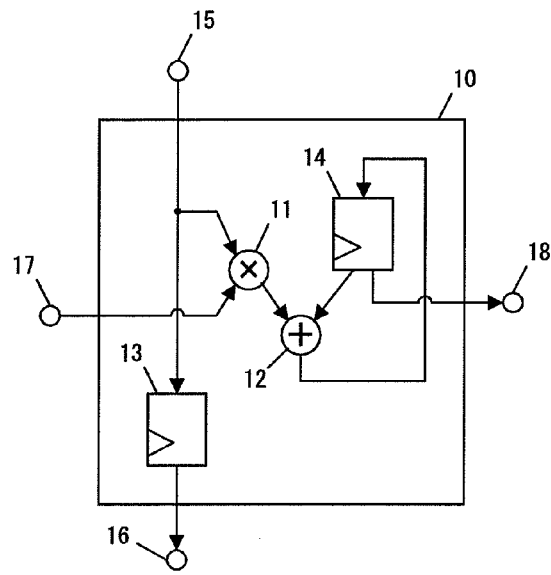

Fig. 8

| clk | 0 | 1 | 2 | 3 | 4 | 5 | 6 | 7 | 8 | 9 | 10 | 11 |
|---|---|---|---|---|---|---|---|---|---|---|---|---|
| vertical filtering input | | | | | | | | | | | | |
| input pixel value of in0 | X0 | X1 | X2 | X3 | X4 | X5 | | * | * | * | * | * |
| input pixel value of in1 | | X1 | X2 | X3 | X4 | X5 | X6 | | * | * | * | * |
| input pixel value of in2 | | | X2 | X3 | X4 | X5 | X6 | X7 | | * | * | * |
| input pixel value of in3 | | | | X3 | X4 | X5 | X6 | X7 | X8 | | * | * |
| input coefficient value of inA | a | b | c | d | e | f | | * | * | * | * | * |
| input coefficient value of inB | | a | b | c | d | e | f | | * | * | * | * |
| input coefficient value of inC | | | a | b | c | d | e | f | | * | * | * |
| input coefficient value of inD | | | | a | b | c | d | e | f | | * | * |
| vertical filtering output | | | | | | | | Y0 | Y1 | Y2 | Y3 | * |
| horizontal filtering input | | | | | | | | Y0 | Y1 | Y2 | Y3 | |
| horizontal filtering output | | | | | | | | | Z0 | Z1 | Z2 | Z3 |

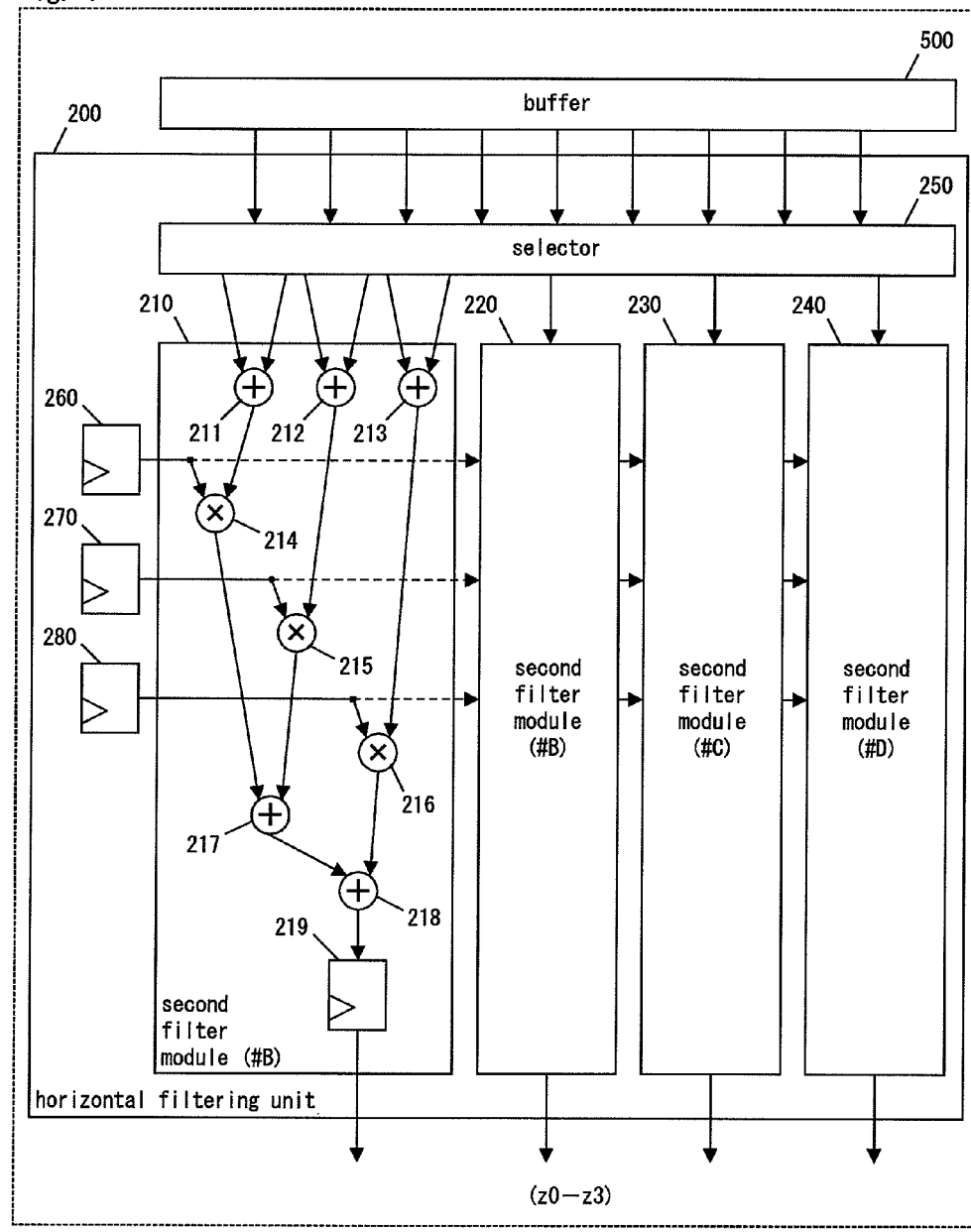

Fig. 12

| clk | 0 | 1 | 2 | 3 | 4 | 5 | 6 | 7 | 8 | 9 | 10 | 11 |
|---|---|---|---|---|---|---|---|---|---|---|---|---|
| horizontal filtering input | Y0 | Y1 | Y2 | Y3 | Y4 | Y5 | Y6 | Y7 | Y8 | | | |
| horizontal filtering output | | Z0 | Z1 | Z2 | Z3 | Z4 | Z5 | Z6 | Z7 | Z8 | | |
| vertical filtering input | | | | | | | | | | | | |
| input pixel value of in0 | | | X0 | X1 | X2 | X3 | X4 | X5 | | | | |
| input pixel value of in1 | | | | X1 | X2 | X3 | X4 | X5 | X6 | | | |
| input pixel value of in2 | | | | | X2 | X3 | X4 | X5 | X6 | X7 | | |
| input pixel value of in3 | | | | | | X3 | X4 | X5 | X6 | X7 | X8 | |
| input coefficient value of inA | | | a | b | c | d | e | f | | | | |
| input coefficient value of inB | | | | a | b | c | d | e | f | | | |
| input coefficient value of inC | | | | | a | b | c | d | e | f | | |
| input coefficient value of inD | | | | | | a | b | c | d | e | f | |
| vertical filtering output | | | | | | | | | Y0 | Y1 | Y2 | Y3 |

Fig. 13

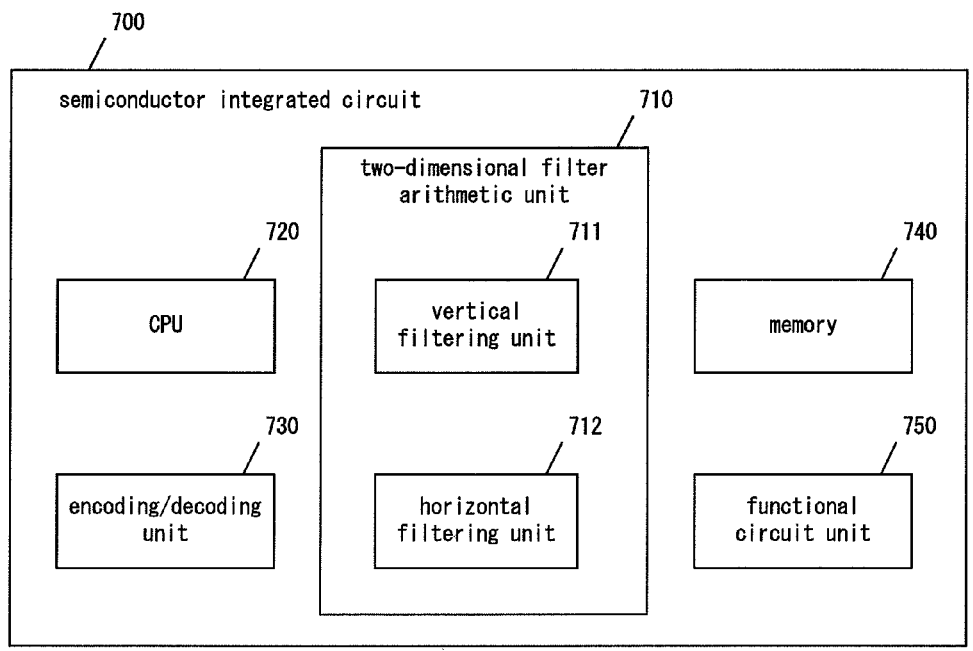

TWO-DIMENSIONAL FILTER ARITHMETIC DEVICE AND METHOD

TECHNICAL FIELD

The present invention relates to a two-dimensional filter arithmetic device to be used for picture compression/expansion processing, in-loop filter processing, scanning line conversion processing, or picture smoothing processing.

BACKGROUND ART

In recent years, the voice encoding technology and motion picture encoding technology based on compression technology of voice and picture data are very important technology in enriching our audio visual life.

Various systems are proposed for the motion picture encoding technology nowadays. As the standards of the motion picture encoding technology, H.261 and H.263 are proposed by ITU-T (International Telecommunication Union-Telecommunication Standardization Sector), and MPEG-1, MPEG-2, and MPEG-4 are proposed by ISO (International Organization for Standardization). (MPEG is the abbreviation of Moving Picture Experts Group). Recently, H.264|MPEG-4 AVC (Advanced Video Coding) has been standardized by ITU-T and ISO jointly, as a new standard of the motion picture encoding technology.

Furthermore, SMPTE (Society of Motion Picture and Television Engineers) adopted "Video Codec 1 (VC1)" as the motion picture encoding technology of a next-generation mass optical disk standard "HD DVD" and "Blu-Ray Disk". In addition, systems such as WMV of Microsoft Corp. and RealVideo of RealNetworks are used for the contents on the Internet.

In this way, many standards are flooding currently, based on different kinds of motion picture encoding technology.

The standards of these motion picture coding systems are adopted individually depending on each applicable field. For example, MPEG-2 is adopted for the current DVD, and as mentioned above, H.264|MPEG-4 AVC and VC1 are adopted for the next-generation DVD. H.264|MPEG-4 AVC is adopted for the digital broadcasting of which the service has been already started in Japan. H.263 or MPEG-4 Simple Profile is adopted for video-phoning by mobile phones. Many WMV systems and RealVideo systems are adopted for the contents on the Internet.

On the other hand, the motion picture encoding technology in recent years is performing complicated compression/expansion processing for the improvement in compression ratio of a motion picture. For this reason, if the number of pixels of the picture for compression/expansion processing increases, the required amount of calculation will become huge.

CPU incorporated in video equipment, such as a digital television, DVD, or a mobile phone, has a lower operating frequency than CPU mounted in a personal computer. Since the software processing by such a CPU with a low operating frequency is not speedy enough to perform the expansion processing (decoding processing) of the motion picture which requires the huge amount of calculation as mentioned above, the video equipment often mounts a hardware dedicated for the expansion processing to practice processing algorithm directly.

The dedicated hardware is not easy to change its functions after mounting. Therefore, in order that the dedicated hardware can decode efficiently the stream data conforming to one of the plurality of standards mentioned above, it becomes important to take into consideration the similar points and different points of the standards.

Processing which decodes the stream data of a moving image is practiced in the following procedures. Namely, the processing includes variable length decoding to decode variable-length-encoded stream data; inverse-quantization to convert the variable-length-decoded data into frequency domain data; inverse orthogonal transformation to convert the frequency domain data into pixel domain data; and motion compensated prediction to generate an interpolated picture from a reference picture according to a motion vector and to add the interpolated picture and the result of the inverse orthogonal transformation. Among these pieces of processing, the inverse orthogonal transformation and the motion compensated prediction perform common processing called two-dimensional filtering. The two-dimensional filtering is processing which requires a large amount of calculation especially in the decoding processing. In H.264|MPEG-4 AVC, in order to improve compression ratio, the filter processing for interpolation is performed to the reference picture. This filter processing is also two-dimensional filtering.

In this way, two-dimensional filtering technology is important technology employed broadly in the current motion picture processing.

FIG. 16 is a block diagram illustrating the conventional two-dimensional filter which is disclosed by Document 1 (Published Japanese patent application No. 2002-304624). The conventional two-dimensional filter illustrated in FIG. 16 comprises a picture memory 1, line memories 2a-2e, a vertical filtering unit 3, a horizontal filtering unit 4, and shift registers 5-6. In the conventional two-dimensional filter, first, the vertical filtering unit 3 practices a 5-tapped filter arithmetic vertically to the pixel stored in the picture memory 1; subsequently, the horizontal filtering unit 4 practices the same 5-tapped filter arithmetic horizontally to the pixel updated by the vertical direction filter arithmetic.

The following explains the further detailed operation of the conventional two-dimensional filter illustrated in FIG. 16. The pixel values of pixels composing one line of an input picture stored in the picture memory 1 are retrieved to the line memory 2a. When the pixel values of pixels composing the next line are retrieved to the line memory 2a, the pixel values of pixels which were retrieved first to the line memory 2a are transferred to the line memory 2b. By repeating this processing 5 times, the pixel values of pixels composing one line retrieved first will be stored in the line memory 2e, and the pixel values of pixels composing the following lines retrieved, one by one, will be stored also in the line memories 2a-2d. Subsequently, one pixel value of the rightmost pixel of each line memory is retrieved to the vertical filtering unit 3 at the same time, and the vertical direction filter arithmetic is practiced in the vertical filtering unit 3.

The pixel values which are filter-processed by the vertical filtering unit 3 are accumulated in the register 5. When five pixel values which have been filter-processed by the vertical filtering unit 3 are filled in the register 5, those five pixel values are inputted into the horizontal filtering unit 4, and the horizontal direction filter arithmetic is practiced in the horizontal filtering unit 4.

By repeating the above-mentioned processing, the practicing of two-dimensional filter arithmetic to the pixel values of pixels stored in the picture memory 1 is completed.

However, in the conventional two-dimensional filter illustrated in FIG. 16, in order to practice the vertical direction filter arithmetic, a buffer (line memories 2a-2e) was required for rearranging vertically the pixel values of the pixels retrieved horizontally. The path of the control circuit for controlling the buffer is required separately, in addition to the data path which practices the filter arithmetic, thereby causing increase in the circuit area. This problem is surely encountered, when the data path which practices the vertical direction filtering and the data path which practices the horizontal direction filtering possess the same data path structure as those in the conventional art. In the conventional two-dimensional filter illustrated in FIG. 16, there is another problem in that sequence of the filtering direction can not be changed easily.

Document 2 (U.S. Pat. No. 5,289,292) discloses technology in which a pixel data density is converted to generate a reduced display screen, using a horizontal direction filter and a vertical direction filter. The technology disclosed by Documents 2 requires a delay circuit (it corresponds to a buffer) between the horizontal direction filtering and the vertical direction filtering, for rearranging pixel data.

Document 3 (U.S. Pat. No. 5,410,362) discloses two-dimensional digital filtering technology employing a horizontal direction filter and a simple-structure vertical direction filter. The technology disclosed by Document 3 also requires a delay circuit (it corresponds to a buffer) which accumulates pixel data which are filter-processed in the horizontal direction before the filter-processing in the vertical direction is performed.

SUMMARY OF THE INVENTION

In view of the above, an object of the present invention is to provide a two-dimensional filter arithmetic device which does not require a buffer for absorbing the difference of filtering directions, and allows an easy change of the sequence of the filtering direction, in performing two-dimensional filtering to pixel values of pixels on a picture.

A first aspect of the present invention provides a two-dimensional filter arithmetic device comprising: a storage unit operable to store picture data to be filtered; a first filtering unit operable to perform first filter arithmetic to the picture data to be filtered, the picture data being stored in the storage unit; and a second filtering unit operable to perform second filter arithmetic to the picture data filtered by the first filtering unit, wherein the first filtering unit and the second filtering unit perform mutually different filtering out of vertical direction filter arithmetic and horizontal direction filter arithmetic, and wherein the vertical direction filter arithmetic and the horizontal direction filter arithmetic are performed by mutually different parallel processing.

According to the structure, it is possible to provide a two-dimensional filter arithmetic device which, in the two-dimensional filter arithmetic of picture data to be filtered, can set up sequence of filtering directions arbitrarily and furthermore does not require a buffer for absorbing the difference of the filtering directions. The present two-dimensional filter arithmetic device can reduce as much circuit area as a part which might otherwise be occupied by the unnecessary buffer.

A second aspect of the present invention provides the two-dimensional filter arithmetic device, wherein the parallel processing includes sequential arithmetic processing performed, in parallel, to the picture data to be filtered and parallel arithmetic processing performed, in parallel, to the picture data to be filtered.

According to the structure, the two-dimensional filter arithmetic to picture data to be filtered can choose one of sequential arithmetic processing and parallel arithmetic processing as the data processing, in response to the filtering direction. According to the structure, a buffer for absorbing the difference of the data processing is unnecessary; therefore, it is possible to provide the two-dimensional filter arithmetic device which can reduce as much circuit area as a part which might otherwise be occupied by the unnecessary buffer.

A third aspect of the present invention provides the two-dimensional filter arithmetic device, wherein the first filtering unit comprises a plurality of first filter modules, and the second filtering unit comprises at least one second filter module, wherein the plurality of first filter modules perform respectively the first filter arithmetic to the picture data to be filtered; thereby, the first filtering unit outputs a plurality of first filtering results, and wherein the at least one second filter module inputs at least part of the plurality of first filtering results, to perform the second filter arithmetic; thereby, the second filtering unit outputs at least one second filtering result.

According to the structure, to the pixel values of a plurality of pixels, a plurality of horizontal direction filtering (or vertical direction filtering) are practiced, and a plurality of pixel values treated by the filter processing are obtained. Subsequently, to the plurality of obtained pixel values, at least one vertical direction filtering (or horizontal direction filtering) is practiced and a plurality of pixel values treated by the two-dimensional filtering are generated.

A fourth aspect of the present invention provides the two-dimensional filter arithmetic device, wherein the first filtering unit performs in parallel the first filter arithmetic using the plurality of first filter modules, and wherein when the second filtering unit comprises a plurality of second filter modules, the second filtering unit performs in parallel the second filter arithmetic using the plurality of second filter modules.

According to the structure, a plurality of horizontal direction filtering (or vertical direction filtering) and, subsequently, a plurality of vertical direction filtering (or horizontal direction filtering) can be practiced in parallel, respectively. Therefore, a more efficient two-dimensional filter arithmetic device can be realized.

A fifth aspect of the present invention provides the two-dimensional filter arithmetic device, wherein each of the plurality of first filter modules comprises: a plurality of accumulation units which are composed of a first-stage accumulation unit and at least one latter-stage accumulation unit, each of the plurality of accumulation units being connected in cascade; and a selecting unit operable to sequentially select the respective outputs of the plurality of accumulation units. Predetermined filter coefficients are supplied to the first-stage accumulation unit, sequentially per unit processing time, and the predetermined filter coefficients are transferred from the first-stage accumulation unit to the at least one latter-stage accumulation unit, sequentially per unit processing time. Pixel values of pixels, aligned horizontally or vertically, of the picture data to be filtered are inputted from the storage unit to each of the plurality of accumulation units, sequentially per unit processing time, and the plurality of accumulation units perform product-sum operation between the pixel values and the predetermined filter coefficients respectively, thereby outputting the plurality of first filtering results.

According to the structure, it is possible to realize a first filter module which shift-inputs the filter coefficients, inputs the pixel values in parallel, and performs efficiently the product-sum operation of the pixel values and the filter coefficients by in-loop pipeline processing.

A sixth aspect of the present invention provides the two-dimensional filter arithmetic device, wherein the at least one second filter module comprises: a plurality of adding units; and a plurality of multiplying units, wherein the at least one second filter module performs product-sum operation between at least part of the plurality of first filtering results and the plurality of predetermined filter coefficients, thereby outputting the at least one second filtering result.

According to the structure, it is possible to realize a second filter module which inputs the arithmetic results outputted by the first filter module, and performs efficiently the product-sum operation of the arithmetic results and filter coefficients by in-loop parallel processing. Consequently, the two-dimensional filter arithmetic can be completed.

A seventh aspect of the present invention provides the two-dimensional filter arithmetic device, wherein the plurality of first filter modules perform the first filter arithmetic, following either one of in-loop pipeline processing system and in-loop parallel processing system, and wherein the at least one second filter module performs the second filter arithmetic, following either one of the in-loop pipeline processing system and the in-loop parallel processing system, but the one not followed by the plurality of first filter modules.

According to the structure, it is possible to realize a two-dimensional filter arithmetic device which is composed of the first filtering unit and the second filtering unit; the first filtering unit performs the first filter processing by in-loop pipeline processing (or in-loop parallel processing), and the second filtering unit performs the second filter processing by in-loop parallel processing (or in-loop pipeline processing).

An eighth aspect of the present invention provides the two-dimensional filter arithmetic device, further comprising: a line memory operable to acquire pixel values of pixels of one line from the storage unit, to store the acquired pixel values of pixels temporally, and to output the temporally-stored pixel values of pixels to the first filtering unit.

According to the structure, it is possible to realize a two-dimensional filter arithmetic device which performs more efficiently the transfer of pixel values from the storage unit to the filter arithmetic unit.

A ninth aspect of the present invention provides a two-dimensional filter arithmetic device comprising: a storage unit operable to store picture data to be filtered; a vertical filtering unit operable to perform vertical direction filter arithmetic; a horizontal filtering unit operable to perform horizontal direction filter arithmetic; a first selecting unit operable to select one of outputs of the storage unit and the horizontal filtering unit, thereby outputting the selected output to the vertical filtering unit; a second selecting unit operable to select one of outputs of the storage unit and the vertical filtering unit, thereby outputting the selected output to the horizontal filtering unit; and a third selecting unit operable to select one of outputs of the vertical filtering unit and the horizontal filtering unit, thereby outputting the selected output as a two-dimensional filter arithmetic result. The vertical direction filter arithmetic and the horizontal direction filter arithmetic are performed by mutually different parallel processing. When a first operation mode is selected, the first selecting unit selects the output of the storage unit, the second selecting unit selects the output of the vertical filtering unit, and the third selecting unit selects the output of the horizontal filtering unit; thereby, the vertical direction filter arithmetic and the horizontal direction filter arithmetic are performed in this order to the picture data to be filtered, the picture data being stored in the storage unit. When a second operation mode is selected, the second selecting unit selects the output of the storage unit, the first selecting unit selects the output of the horizontal filtering unit, and the third selecting unit selects the output of the vertical filtering unit; thereby, the horizontal direction filter arithmetic and the vertical direction filter arithmetic are performed in this order to the picture data to be filtered, the picture data being stored in the storage unit.

According to the structure, it is possible to realize a two-dimensional filter arithmetic device which can change arbitrarily the sequence of the vertical direction filter arithmetic and the horizontal direction filter arithmetic.

A tenth aspect of the present invention provides the two-dimensional filter arithmetic device, wherein the parallel processing includes sequential arithmetic processing which is performed in parallel, to the picture data to be filtered, and parallel arithmetic processing which is performed in parallel, to the picture data to be filtered.

According to the structure, the two-dimensional filter arithmetic to picture data to be filtered can practice either of the sequential arithmetic processing or the parallel arithmetic processing, according to the filtering direction. Furthermore, according to the structure, a buffer for absorbing the difference of data processing is unnecessary; therefore, it is possible to provide a two-dimensional filter arithmetic device which can reduce as much circuit area as a part which might otherwise be occupied by the unnecessary buffer.

An eleventh aspect of the present invention provides the two-dimensional filter arithmetic device, wherein selection between the first operation mode and the second operation mode is made according to a motion picture coding standard to which the picture data to be filtered is pursuant.

According to the structure, the execution sequence of the vertical direction filter arithmetic and the horizontal direction filter arithmetic can be changed arbitrarily, according to the motion picture coding standard to which the picture data to be filtered conforms.

EFFECT OF THE INVENTION

According to the present invention, it is possible to provide a two-dimensional filter arithmetic device which does not require a buffer for absorbing the difference of the filtering directions and allows an easy change of the sequence of the filtering directions, when performing two-dimensional filtering to the pixel values of pixels on a picture.

BRIEF DESCRIPTION OF THE DRAWINGS

FIG. 7 is a block diagram illustrating a processor element in Embodiment 1 of the present invention;

FIG. 8 is a timing chart of a two-dimensional filter arithmetic device in Embodiment 1 of the present invention;

FIG. 9 is a block diagram illustrating a horizontal filtering unit in Embodiment 1 of the present invention;

FIG. 12 is a timing chart of a two-dimensional filter arithmetic device (the second operation mode) in Embodiment 2 of the present invention;

FIG. 13 is a block diagram illustrating a semiconductor integrated circuit in Embodiment 3 of the present invention;

DETAILED DESCRIPTION OF THE INVENTION

The embodiments of the present invention are explained in the following, with reference to the accompanying figures.

Embodiment 1

Embodiment 1 of the present invention treats the two-dimensional filtering in the motion compensated prediction arithmetic which is in conformity with H.264|MPEG-4 AVC as an example.

The present invention can be applied to general two-dimensional filter arithmetic, and is not limited to the present embodiment.

In the motion compensated prediction arithmetic illustrated by the present embodiment, it is assumed that a picture area composed of the (4×4) pixels of full-pel precision is translated to a new picture area according to a motion vector (½, ½), and that the pixel values of pixels of half-pel precision included in the new picture area are calculated. In the present arithmetic, the pixel value of the pixel of half-pel precision included in the new picture area is calculated by performing the two-dimensional filter arithmetic with 6 taps to the pixel values of the pixels of full-pel precision. (In the following description, a pixel of full-pel precision is called a "full pel" for short, and a pixel of half-pel precision is called a "half pel" for short.)

Figure 1:
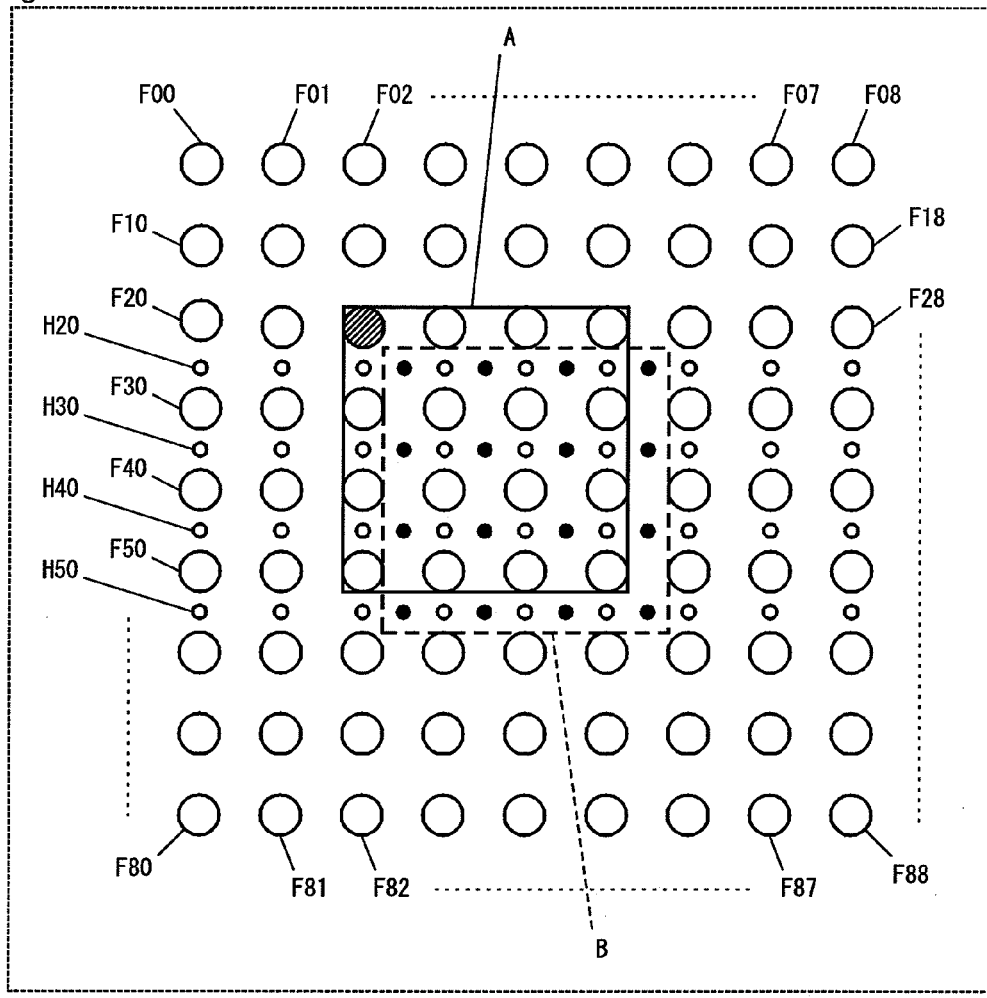
FIG. 1 is a location diagram illustrating full pels and half pels in Embodiment 1 of the present invention.

FIG. 1 is a location diagram illustrating full pels and half pels in Embodiment 1 of the present invention. The full pels illustrated by large white circles in FIG. 1 are arranged horizontally in order of full pels F00, F01, F02 . . . F08, and vertically in order of full pels F00, F10, F20 . . . F80.

Now, it is assumed that in FIG. 1, a picture area A (the (4×4) full pels) encompassed with a solid-line rectangle is translated to a picture area B encompassed with a dashed-line rectangle, according to a motion vector (½, ½). The pixels which specify the picture area B are the (4×4) half pels illustrated by small black circles. The half pels illustrated by these black circles are exactly located on the diagonal lines of the full pels. Therefore, in order to interpolate the pixel values of the half pels illustrated by the black circles by a horizontal direction filter, the pixel values of half pels illustrated by small white circles are required. (The horizontal direction filter is a 6-tap filter, and requires the pixel values of six neighboring pixels located in right and left of the pixel of which the pixel value is interpolated.) The pixel values of the half pels illustrated by the small white circles are interpolated by a vertical direction filter using the pixel values of full pels F00-F88. (In FIG. 1, as for the half pels, only the ones necessary for explanation are illustrated.)

Figure 2:
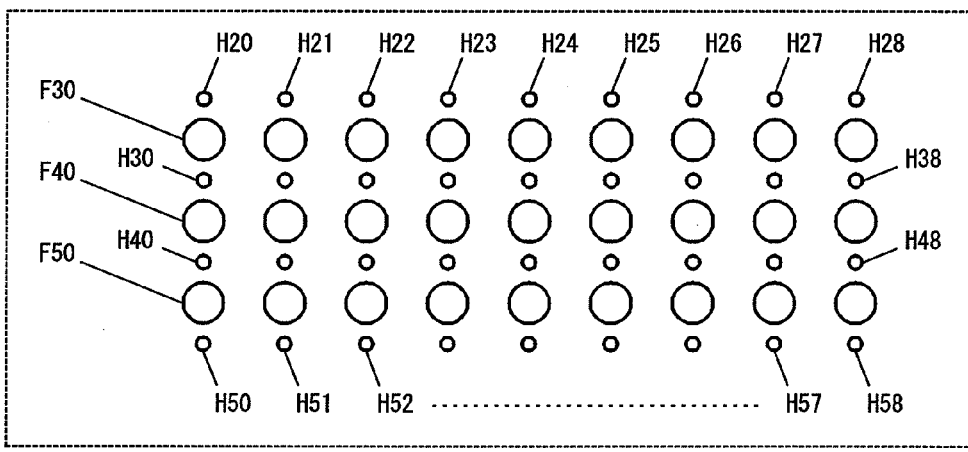
FIG. 2 is a location diagram illustrating half pels in Embodiment 1 of the present invention.

FIG. 2 is a location diagram illustrating half pels in Embodiment 1 of the present invention. FIG. 2 illustrates arrangement of the half pels of small white circles (half pels H20-H58), and only the full pels among them, in order to make the reference symbols legible.

Figure 3:
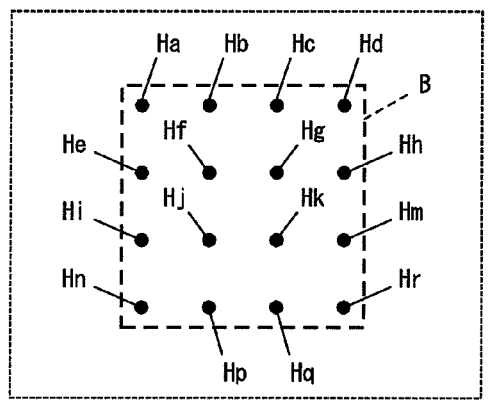
FIG. 3 is another location diagram illustrating half pels in Embodiment 1 of the present invention.

FIG. 3 is another location diagram illustrating half pels in Embodiment 1 of the present invention. In order to make the reference symbols legible, FIG. 3 illustrates only the half pels Ha, Hb, Hc, Hd, He, Hf, Hg, Hh, Hi, Hj, Hk, Hm, Hn, Hp, Hq, and Hr (hereinafter written as half pels Ha-Hr) of small black circles located in the picture area.

With reference to FIGS. 1-3, the following explains the process in which the pixel values of half pels Ha-Hr are calculated by a 6-tap two-dimensional filter. By the method of the two-dimensional filter arithmetic of the present embodiment, the vertical direction filter arithmetic is performed first to full pels F00-F88, thereby calculating half pels H20-H58. Subsequently, the horizontal direction filter arithmetic is performed to the half pels H20-H58 calculated by the vertical direction filter arithmetic, thereby calculating half pels Ha-Hr.

The vertical direction filter arithmetic is performed to the full pels F00, F10, F20 . . . F80 of FIG. 1 to interpolate the pixel values of the half pels H20, H30, H40, and H50 of FIG. 2. The equation of the filter arithmetic is given by the following equation, $$Y = a \times X_0 + b \times X_1 + c \times X_2 + d \times X_3 + e \times X_4 + f \times X_5 \quad \text{(Equation 1)}$$

In Equation 1, the variable "Y" on the left-hand side is a pixel value of a pixel to be interpolated, and the variables "X0-X5" on the right-hand side are the pixel values of six pixels; three pixels each adjoining on the upper or lower sides of the pixel to be interpolated, in the case of the vertical direction filter arithmetic, or three pixels each adjoining on the right and left sides of the pixel to be interpolated, in the case of the horizontal direction filter arithmetic.

In the case of the motion compensated prediction of H264|MPEG-4 AVC, the coefficients of the right-hand side of Equation 1 are: a=1, b=−5, c=20, d=20, e=−5, and f=1. Therefore, Equation 1 is expressed as Equation 2.

$$Y = X_0 - 5 \times X_1 + 20 \times X_2 + 20 \times X_3 - 5 \times X_4 + X_5 \quad \text{(Equation 2)}$$

For example, using Equation 2, the pixel value "Y" of the half pel H20 is generated as follows; the pixel value of full pel F00 is substituted for the variable "X0", the pixel value of full pel F10 is substituted for the variable "X1", the pixel value of full pel F20 is substituted for the variable "X2", the pixel value of full pel F30 is substituted for the variable "X3", the pixel value of full pel F40 is substituted for the variable "X4", and the pixel value of full pel F50 is substituted for the variable "X5".

In a similar manner, the pixel values of full pels, which are to be substituted for the variables "X0-X5", are shifted below one by one, and the pixel values of half pels H30, H40, and H50 can be generated one by one.

The vertical direction filter arithmetic mentioned above is practiced to the pixel values of the column series of full pels "F00-F80", "F01-F81" . . . "F08-F88"; thereby, the pixel values of the column series of half pels "H20-H50", "H21-H51" . . . "H28-H58", illustrated in FIG. 2, are respectively generated.

Subsequently, using the pixel values of the half pels H20-H58 generated above, the horizontal direction filter arithmetic is practiced to generate the pixel values of half pels Ha-Hr of FIG. 3. The equation of the horizontal direction filter arithmetic is the same as that of Equation 1, and the values of coefficients in the equation are the same as those of the vertical direction filter arithmetic.

For example, using Equation 2, the pixel value "Y" of the half pel Ha is generated as follows; the pixel value of half pel H20 is substituted for the variable "X0", the pixel value of half pel H21 is substituted for the variable "X1", the pixel value of half pel H22 is substituted for the variable "X2", the pixel value of half pel H23 is substituted for the variable "X3", the pixel value of half pel H24 is substituted for the variable "X4", and the pixel value of half pel H25 is substituted for the variable "X5".

In a similar manner, the pixel values of half pels, which are to be substituted for the variables "X0-X5", are shifted to the right one by one, and the pixel values of half pels Hb, He, and Hd can be generated one by one.

The horizontal direction filter arithmetic mentioned above is practiced to the pixel values of the row series of half pels "H20-H28", "H30-H38", "H40-H48", and "H50-H58"; thereby, the pixel values of the half pels Ha-Hr, illustrated in FIG. 3, are respectively generated.

Next, the two-dimensional filter arithmetic device of the present invention is explained.

Figure 4:
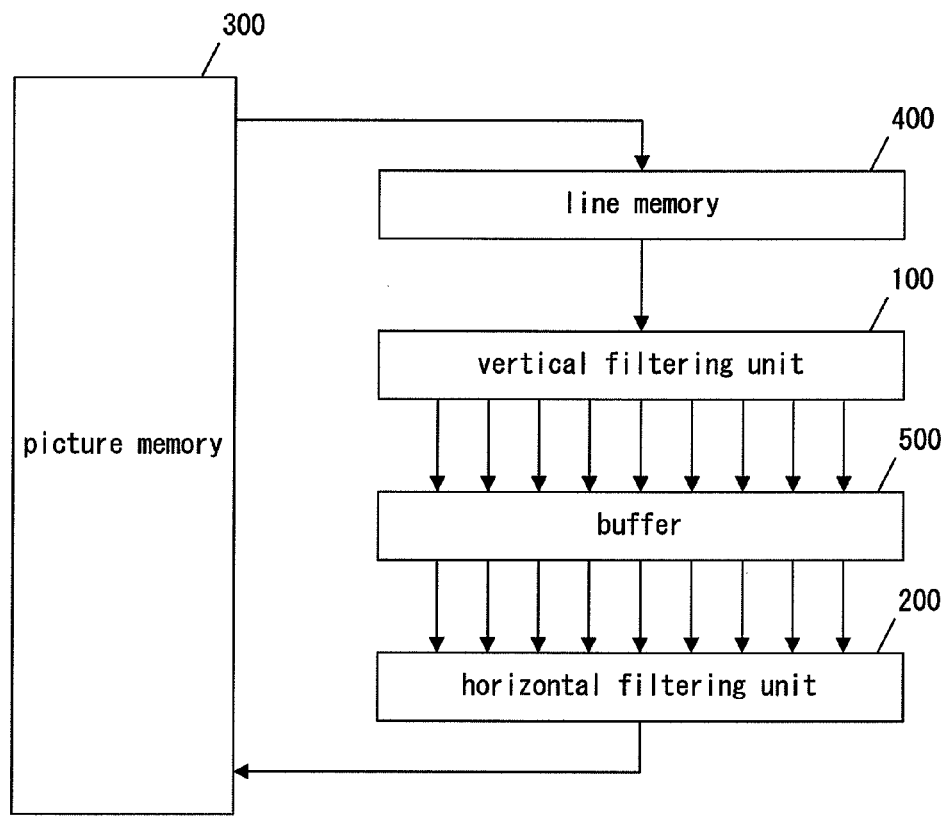
FIG. 4 is a block diagram illustrating a two-dimensional filter arithmetic device in Embodiment 1 of the present invention.

FIG. 4 is a block diagram illustrating a two-dimensional filter arithmetic device in Embodiment 1 of the present invention. The two-dimensional filter arithmetic device of the present embodiment illustrated in FIG. 4 comprises a picture memory 300, a line memory 400, a vertical filtering unit 100, a buffer 500, and a horizontal filtering unit 200.

The vertical filtering unit 100 corresponds to the first filtering unit, and the horizontal filtering unit 200 corresponds to the second filtering unit.

The two-dimensional filter arithmetic device of the present embodiment performs the vertical direction filter arithmetic first, and then performs the horizontal direction filter arithmetic. Of course, this sequence may be reversed.

Figure 5:
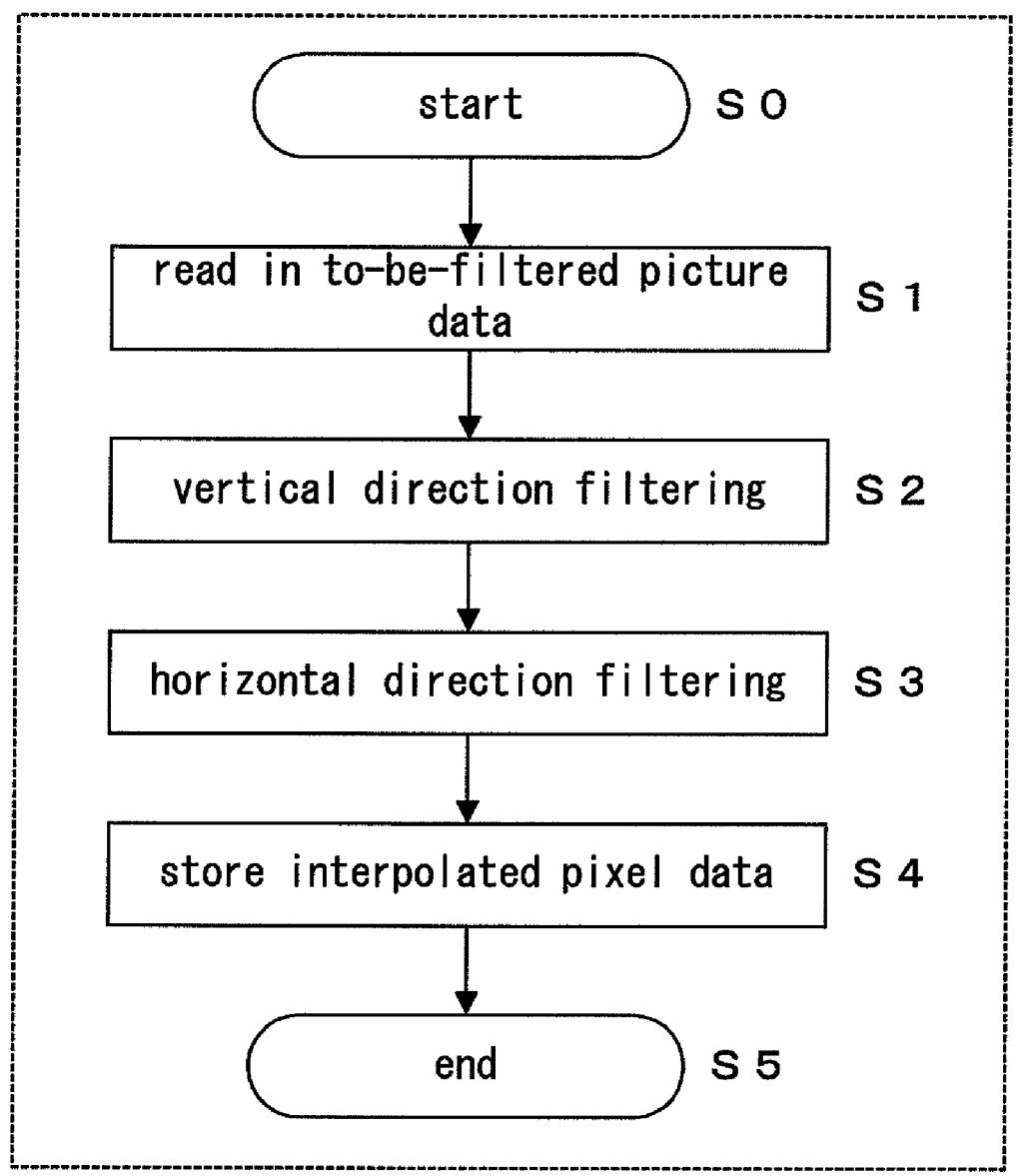
FIG. 5 is a flow chart for a two-dimensional filter arithmetic method in Embodiment 1 of the present invention.

FIG. 5 is a flow chart for a two-dimensional filter arithmetic method in Embodiment 1 of the present invention. According to FIG. 5, the outline of operation of the two-dimensional filter arithmetic device of the present embodiment illustrated in FIG. 4 is explained in the following.

A two-dimensional filter arithmetic processing starts at Step S0 of FIG. 5.

At Step S1, picture data (pixel values of full pels) are sent from the picture memory 300 to the line memory 400.

At Step S2, the vertical filtering unit 100 reads the pixel values of full pels from the line memory 400, performs the vertical direction filter arithmetic, and calculates the pixel values of half pels. This execution generates the pixel values of the column series of half pels "H20-H50", "H21-H51" . . . "H28-H58" illustrated in FIG. 2, from the pixel values of the column series of full pels "F00-F80", "F01-F81" . . . "F08-F88" illustrated in FIG. 1.

At Step S3, the horizontal filtering unit 200 practices the horizontal direction filter arithmetic to the pixel values of half pels H20-H58 generated in Step S2, thereby generating the pixel values of half pels Ha-Hr.

At Step S4, the horizontal filtering unit 200 stores the generated pixel values of half pels Ha-Hr into the picture memory 300 as the pixel data of the half pels which compose the picture area B. The processing is completed at Step S5.

In the processing from Step S1 to Step S4 of FIG. 5 mentioned above, some portions overlap mutually and are practiced in parallel. In the following, the operation of the two-dimensional filter arithmetic device illustrated in FIG. 4 is explained in more detail. In FIG. 4, the picture memory 300 stores the pixel values of full pels as picture data.

The line memory 400 takes in the pixel values of full pels for one line in the horizontal direction from the picture memory 300. The line memory 400 sends the pixel values of full pels F00-F08, which are illustrated in FIG. 1 and included in these pixel values for one line, to the vertical filtering unit 100 one by one. When the line memory 400 finishes sending the pixel values of full pels F00-F08, the line memory 400 will take in the pixel values of full pels for the next line in the horizontal direction. The line memory 400 repeats this operation, and the row series of full pels "F00-F08", "F10-F18" . . . "F80-F88" of FIG. 1 are sent to the vertical filtering unit 100 in sequence.

The vertical filtering unit 100 practices the vertical direction filter arithmetic, in parallel, to the column series of full pels "F00-F80", "F01-F81" . . . "F08-F88". By this processing, the pixel values of the row series of half pels "H20-H28" illustrated in FIG. 2 are first generated in parallel and are outputted to the buffer 500. Next, the pixel values of the row series of half pels "H30-H38" are generated in parallel, then the pixel values of the row series of half pels "H40-H48" are generated in parallel, and finally the pixel values of the row series of half pels "H50-H58" are generated in parallel. The respective pixel values generated are outputted to the buffer 500.

The horizontal filtering unit 200 takes in the pixel values of the row series of half pels "H20-H28" from the buffer 500, and generates the pixel values of half pels Ha, Hb, He, and Hd by the horizontal direction filter arithmetic. Next, the horizontal filtering unit 200 takes in the pixel values of the row series of half pels "H30-H38", generates the pixel values of half pels He, Hf, Hg, and Hh; takes in the pixel values of the row series of half pels "H40-H48", generates the pixel values of half pels Hi, Hj, Hk, and Hm; finally, takes in the pixel values of the row series of half pels "H50-H58", and generates the pixel values of half pels Hn, Hp, Hq, and Hr. The horizontal filtering unit 200 outputs the generated pixel values of half pels Ha-Hr to the picture memory 300 in sequence.

The pixel values of half pels Ha-Hr of the picture area B illustrated in FIG. 1 are generated by the two-dimensional filter arithmetic described above.

Next, the structure and operation of the vertical filtering unit 100 and the horizontal filtering unit 200, possessed by the two-dimensional filter arithmetic device of the present embodiment, are described.

Figure 6:
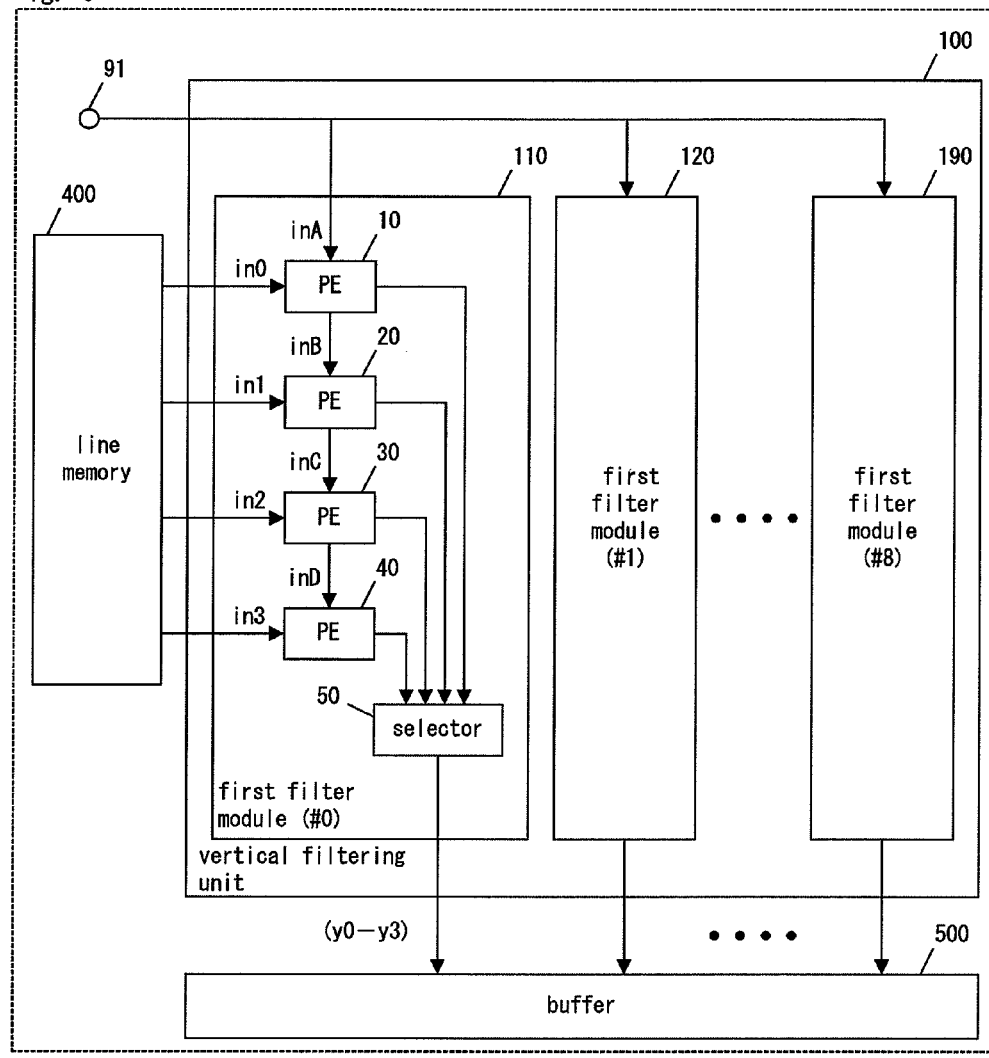
FIG. 6 is a block diagram illustrating a vertical filtering unit in Embodiment 1 of the present invention.

FIG. 6 is a block diagram illustrating the vertical filtering unit 100 in Embodiment 1 of the present invention. In FIG. 6, the same components as those in FIG. 4 are attached with the same reference symbols or numerals and the descriptions thereof are omitted.

The vertical filtering unit 100 of the present embodiment illustrated in FIG. 6 comprises nine pieces of first filter modules (#0) 110-(#8) 190 installed in parallel.

The first filter module (#0) 110 performs the vertical direction filter arithmetic to the column series of full pels "F00-F80" of FIG. 1, the first filter module (#1) 120 performs the vertical direction filter arithmetic to the column series of full pels "F01-F81", and similarly up to the last piece, such that the first filter module (#8) 190 performs the vertical direction filter arithmetic to the column series of full pels "F08-F88."

Nine pieces of the first filter modules (#0) 110-(#8) 190 illustrated in FIG. 6 all possess the same structure. In the following, those structures are explained by taking the first filter module (#0) 110 as an example.

The first filter module (#0) 110 possesses processor elements PE10, PE20, PE30, and PE40, connected in cascade, and a selector 50 which chooses the outputs of these processor elements. The selector 50 corresponds to the selecting unit. In each of processor elements PE10-PE40, a pixel value is inputted into one input terminal from the line memory 400, synchronized with a clock. A filter coefficient is inputted into the other input terminal of the first-stage processor element PE 10 from a coefficient input terminal 91. The filter coefficient which has been inputted into the processor element PE 10 is transferred to the latter-stage processor element, and to further latter-stage processor elements, synchronized with the clock. The processor elements PE10-PE40 perform the product-sum operation of the pixel values and filter coefficients, which were inputted in synchronization with the clock, and output each result to the selector 50. The selector 50 selects the outputted results of the processor elements PE10-PE40 in sequence, and outputs the selected result to the buffer 500. The details of the product-sum operation described above are later described with reference to a timing chart.

FIG. 7 is a block diagram illustrating a processor element PE10 in Embodiment 1 of the present invention. Processor elements PE20-PE40 possess the same structure as the block diagram of the processor element PE10, illustrated in FIG. 7. The processor elements PE10-PE40 correspond to the accumulation units.

In FIG. 7, the processor element PE 10 of the present embodiment possesses a multiplier 11, an adder 12, a flip-flop 13, and a flip-flop 14. A filter coefficient is inputted into a coefficient input terminal 15 (from the coefficient input terminal 91 to the processor element PE 10), and the filter coefficient is outputted from a coefficient output terminal 16 via the flip-flop 13 to a latter-stage processor element (from the processor element PE 10 to the processor element PE 20) at the time of the following clock. A pixel value is inputted from the line memory 400 to a pixel data input terminal 17, and a product of the pixel value and the filter coefficient which is inputted from the coefficient input terminal 15 is calculated by the multiplier 11. In the adder 12, the arithmetic result of the multiplier 11 is added with the product-sum value which has been already calculated and accumulated in the flip-flop 14, to update the product-sum value of the flip-flop 14. The final product-sum value, i.e., the value obtained after performing the product-sum operation of six pixel values and six filter coefficients, is outputted to the selector 50 as a pixel value of a half pel.

FIG. 8 is a timing chart of the two-dimensional filter arithmetic device in Embodiment 1 of the present invention. In FIG. 8, the horizontal axis represents the number of cycles of a clock (clk). The vertical axis represents the pixel values and filter coefficients which are inputted into the vertical filtering unit 100 illustrated in FIG. 6, the pixel value which is outputted from the vertical filtering unit 100, the pixel value which is inputted into the horizontal filtering unit 200 illustrated in FIG. 9, and the pixel value which is outputted from the horizontal filtering unit 200.

In the following, with reference to FIG. 8, the vertical direction filter arithmetic of the vertical filtering unit 100 is explained.

At clock 0, a pixel value "X0" is inputted from the line memory 400 to a pixel-data-input-terminal in0 of the processor element PE 10, a filter coefficient "a" is inputted from the coefficient input terminal 91 to a coefficient input terminal inA of the processor element PE 10 and the following arithmetic is practiced in the processor element PE 10. Namely, multiplication "a*X0" is practiced in the multiplier 11; in the adder 12, the multiplication result "a*X0" is added to the product-sum result accumulated in the flip-flop 14; and the product-sum result of the flip-flop 14 is updated. In this case, since the product-sum result is not accumulated yet in the flip-flop 14, the multiplication result "a*X0" is held in the flip-flop 14. The filter coefficient "a" is held in the flip-flop 13, in order to be transferred to the latter-stage processor element PE 20.

It should be noted here that the above-mentioned processing at clock 0 is practiced at the same time in the first filter modules (#0) 110-(#8) 190 in the vertical filtering unit 100 of FIG. 6. Namely, from the line memory 400 of FIG. 6, a pixel value is also sent, in parallel, by connection not illustrated, to each processor element PE10-PE40 of the first filter modules (#1) 120-(#8) 190. Therefore, the pixel values "X0-X8" shown in FIG. 8 express the pixel values of the full pels F00-F80 of FIG. 1, in the first filter module (#0) 110, and express the pixel values of full pels F01-F81, in the first filter module (#1) 120, and similarly up to the last pieces, such that the pixel values "X0-X8" express the pixel values of full pels F08-F88, in the first filter module (#8) 190. Consequently, at clock 0, in the first filter module (#0) 110, a multiplication result of "a*(the pixel value of full pel F00)" is held at the processor element PE 10; in the first filter module (#1) 120, a multiplication result of "a*(the pixel value of full pel F01)" is held at the processor element PE 10; and similarly to the last pieces, such that in the first filter module (#8) 190, a multiplication result of "a*(the pixel value of full pel F08)" is held at the processor element PE 10.

At this time, the multiplication of "a*X0" (the 1st term of the right-hand side of Equation 1) is completed for the first tap of 6-tap filters for calculating the pixel value of each of the row series of half pels "H20-H28" in parallel.

Next, at clock 1, a pixel value "X1" is inputted from the line memory 400 to the pixel-data-input-terminal in0 of the processor element PE 10, a filter coefficient "b" is inputted from the coefficient input terminal 91 to the coefficient input terminal inA of the processor element PE 10, and the following arithmetic is practiced in the processor element PE 10. Namely, multiplication "b*X1" is practiced in the multiplier 11; in the adder 12, the multiplication result "b*X1" (the second term of the right-hand side of Equation 1) is added to the product-sum result "a*X0" accumulated in the flip-flop 14; and the product-sum result of the flip-flop 14 is updated to "a*X0+b*X1." The filter coefficient "b" is held in the flip-flop 13.

At the same time, at clock 1, the pixel value "X1" is inputted from the line memory 400 to a pixel-data-input-terminal in1 of the processor element PE 20, the filter coefficient "a" is inputted from the flip-flop 13 of the processor element PE 10 to a coefficient input terminal inB of the processor element PE 20, and the following arithmetic is practiced in the processor element PE 20. Namely, multiplication "a*X1" is practiced in the multiplier 11; in the adder 12, the multiplication result "a*X1" is added to the product-sum result accumulated in the flip-flop 14; and the product-sum result of the flip-flop 14 is updated. In this case, since the product-sum result is not accumulated yet in the flip-flop 14, the multiplication result "a*X1" is held in the flip-flop 14. The filter coefficient "a" is held in the flip-flop 13, in order to be transferred to the latter-stage processor element PE 30.

Also at clock 1, the above-mentioned processing is practiced at the same time in the first filter modules (#0) 110-(#8) 190 in the vertical filtering unit 100 of FIG. 6. Namely, the pixel value "X1" shown in FIG. 8 expresses the pixel value of full pel F10 of FIG. 1, in the first filter module (#0) 110, and expresses the pixel value of full pel F11, in the first filter module (#1) 120, and similarly up to the last pieces, such that the pixel value "X1" expresses the pixel value of full pel F18, in the first filter module (#8) 190.

Next, at clock 2, a pixel value "X2" is inputted from the line memory 400 to the pixel-data-input-terminal in0 of the processor element PE 10, a filter coefficient "c" is inputted from the coefficient input terminal 91 to the coefficient input terminal inA of the processor element PE 10, and the following arithmetic is practiced in the processor element PE 10. Namely, multiplication "c*X2" is practiced in the multiplier 11; in the adder 12, the multiplication result "c*X2" (the third term of the right-hand side of Equation 1) is added to the product-sum result "a*X0+b*X1" accumulated in the flip-flop 14; and the product-sum result of the flip-flop 14 is updated to "a*X0+b*X1+c*X2." The filter coefficient "c" is held in the flip-flop 13.

At the same time, at clock 2, the pixel value "X2" is inputted from the line memory 400 to the pixel-data-input-terminal in1 of the processor element PE 20, the filter coefficient "b" is inputted from the flip-flop 13 of the processor element PE 10 to the coefficient input terminal inB of the processor element PE 20, and the following arithmetic is practiced in the processor element PE 20. Namely, multiplication "b*X2" is practiced in the multiplier 11; in the adder 12, the multiplication result "b*X2" is added to the product-sum result "a*X1" accumulated in the flip-flop 14; and the product-sum result of the flip-flop 14 is updated to "a*X1+b*X2." The filter coefficient "b" is held in the flip-flop 13, in order to be transferred to the latter-stage.

At the same time, at clock 2, the pixel value "X2" is inputted from the line memory 400 to a pixel-data-input-terminal in2 of the processor element PE 30, the filter coefficient "a" is inputted from the processor element PE 20 to a coefficient input terminal inC of the processor element PE 30, and the following arithmetic is practiced in the processor element PE 30. Namely, multiplication "a*X2" is practiced in the multiplier 11; in the adder 12, the multiplication result "a*X2" is added to the product-sum result accumulated in the flip-flop 14; and the product-sum result of the flip-flop 14 is updated. In this case, since the product-sum result is not accumulated yet in the flip-flop 14, the multiplication result "a*X2" is held in the flip-flop 14. The filter coefficient "a" is held in the flip-flop 13, in order to be transferred to the latter-stage processor element PE 40.

Also at clock 2, the above-mentioned processing is practiced at the same time in the first filter modules (#0) 110-(#8) 190 in the vertical filtering unit 100 of FIG. 6. Namely, the pixel value "X2" shown in FIG. 8 expresses the pixel value of full pel F20 of FIG. 1, in the first filter module (#0) 110, and expresses the pixel value of full pel F21, in the first filter module (#1) 120, and similarly up to the last piece, such that the pixel value "X2" expresses the pixel value of full pel F28, in the first filter module (#8) 190.

Next, at clock 3, a pixel value "X3" is inputted from the line memory 400 to the pixel-data-input-terminal in0 of the processor element PE 10, a filter coefficient "d" is inputted from the coefficient input terminal 91 to the coefficient input terminal inA of the processor element PE 10, the following arithmetic is practiced in the processor element PE 10. Namely, multiplication "d*X3" is practiced in the multiplier 11; in the adder 12, the multiplication result "d*X3" (the fourth term of the right-hand side of Equation 1) is added to the product-sum result "a*X0+b*X1+c*X2" accumulated in the flip-flop 14; and the product-sum result of the flip-flop 14 is updated to "a*X0+b*X1+c*X2+d*X3." The filter coefficient "d" is held in the flip-flop 13.

At the same time, at clock 3, the pixel value "X3" is inputted from the line memory 400 to the pixel-data-input-terminal in1 of the processor element PE 20, the filter coefficient "c" is inputted from the processor element PE 10 to the coefficient input terminal inB of the processor element PE 20, the following arithmetic is practiced in the processor element PE 20. Namely, multiplication "c*X3" is practiced in the multiplier 11; in the adder 12, the multiplication result "c*X3" is added to the product-sum result "a*X1+b*X2" accumulated in the flip-flop 14; and the product-sum result of the flip-flop 14 is updated to "a*X1+b*X2+c*X3." The filter coefficient "c" is held in the flip-flop 13, in order to be transferred to the latter-stage.

At the same time, at clock 3, the pixel value "X3" is inputted from the line memory 400 to the pixel-data-input-terminal in2 of the processor element PE 30, the filter coefficient "b" is inputted from the processor element PE 20 to the coefficient input terminal inC of the processor element PE 30, The following arithmetic is practiced in the processor element PE 30. Namely, multiplication "b*X3" is practiced in the multiplier 11; in the adder 12, the multiplication result "b*X3" is added to the product-sum result "a*X2" accumulated in the flip-flop 14; and the product-sum result of the flip-flop 14 is updated to "a*X2+b*X3." The filter coefficient "b" is held in the flip-flop 13, in order to be transferred to the latter-stage.

At the same time, at clock 3, the pixel value "X3" is inputted from the line memory 400 to a pixel-data-input-terminal in3 of the processor element PE 40, the filter coefficient "a" is inputted from the processor element PE 30 to a coefficient input terminal inD of the processor element PE 40, and the following arithmetic is practiced in the processor element PE 30. Namely, multiplication "a*X3" is practiced in the multiplier 11; in the adder 12, the multiplication result "a*X3" is added to the product-sum result accumulated in the flip-flop 14; and the product-sum result of the flip-flop 14 is updated. In this case, since the product-sum result is not accumulated yet in the flip-flop 14, the multiplication result "a*X3" is held in the flip-flop 14.

Also at clock 3, the above-mentioned processing is practiced at the same time in the first filter modules (#0) 110-(#8) 190 in the vertical filtering unit 100 of FIG. 6. Namely, the pixel value "X3" shown in FIG. 8 expresses the pixel value of full pel F30 of FIG. 1, in the first filter module (#0) 110, and expresses the pixel value of full pel F31, in the first filter module (#1) 120, and similarly to the last piece, such that the pixel value "X3" expresses the pixel value of full pel F38, in the first filter module (#8) 190.

When the same processing as the above is repeated, the following result is obtained in each of the first filter modules (#0) 110-(#8) 190:

At clock 4, a product-sum result "a*X0+b*X1+c*X2+d*X3+e*X4" is held in the processor element PE 10, a product-sum result "a*X1+b*X2+c*X3+d*X4" is held in the processor element PE 20, a product-sum result "a*X2+b*X3+c*X4" is held in the processor element PE 30, and a product-sum result "a*X3+b*X4" is held in the processor element PE 40.

At clock 5, a product-sum result "a*X0+b*X1+c*X2+d*X3+e*X4+f*X5" is held in the processor element PE 10, a product-sum result "a*X1+b*X2+c*X3+d*X4+e*X5" is held in the processor element PE 20, a product-sum result "a*X2+b*X3+c*X4+d*X5" is held in the processor element PE 30, a product-sum result "a*X3+b*X4+c*X5" is held in the processor element PE 40. At clock 5, the processor element PE 10 completes the arithmetic of the sixth term of the right-hand-side of Equation 1.

At clock 6, the selector 50 selects the output of the processor element PE 10, and sends a pixel value "Y0" to the buffer 500, as a filtering output of the vertical filtering unit 100.

At clock 6, the pixel value "Y0" shown in FIG. 8 expresses the pixel value of half pel H20 of FIG. 2, in the first filter module (#0) 110, and expresses the pixel value of half pel H21, in the first filter module (#1) 120, and similarly up to the last piece, such that the pixel value "Y0" expresses the pixel value of half pel H28, in the first filter module (#8) 190.

In this way, at clock 6, the first vertical direction filter arithmetic "a*X0+b*X1+c*X2+d*X3+e*X4+f*X5" in the first filter modules (#0) 110-(#8) 190 is completed, and the pixel values of the row series of half pels "H20-H28" are sent from the vertical filtering unit 100 to the buffer 500.

Subsequently, at clock 7, the vertical direction filter arithmetic "a*X1+b*X2+c*X3+d*X4+e*X5+f*X6" is completed, in the first filter modules (#0) 110-(#8) 190, and the pixel values of the row series of half pels "H30-H38" are sent from the vertical filtering unit 100 to the buffer 500.

Furthermore, at clock 8, the vertical direction filter arithmetic "a*X2+b*X3+c*X4+d*X5+e*X6+f*X7" is completed in the first filter modules (#0) 110-(#8) 190, and the pixel values of the row series of half pels "H40-H48" are sent from the vertical filtering unit 100 to the buffer 500.

Finally, at clock 9, the vertical direction filter arithmetic "a*X3+b*X4+c*X5+d*X6+e*X7+f*XS" is completed in the first filter modules (#0) 110-(#8) 190, and the pixel values of the row series of half pels "H50-H58" are sent from the vertical filtering unit 100 to the buffer 500.

After clock 7, the horizontal direction filter arithmetic described in the following is practiced in parallel with the vertical direction filter arithmetic.

FIG. 9 is a block diagram illustrating the horizontal filtering unit in Embodiment 1 of the present invention. In FIG. 9, the same components as those in FIG. 4 are attached with the same reference symbols or numerals and the descriptions thereof are omitted.

The horizontal filtering unit 200 of the present embodiment illustrated in FIG. 9 comprises a selector 250, a second filter module (#A) 210, a second filter module (#B) 220, a second filter module (#C) 230, a second filter module (#D) 240, and flip-flops 260-280. The second filter modules (#A) 210-(#D) 240 possess the same structure. The structure of the second filter module (#A) 210 is explained in the following.

As illustrated in FIG. 9, the second filter module (#A) 210 includes adders 211, 212, 213, 217, and 218, multipliers 214, 215, and 216, and a flip-flop 219. The second filter module (#A) 210 performs the horizontal direction filter arithmetic as shown by Equation 3.

$$Y=(X_0+X_5)-5\times(X_1+X_4)+20\times(X_2+X_3) \quad \text{(Equation 3)}$$

In Equation 3, the terms possessing the same coefficients are put together into one term, when the filter arithmetic possesses symmetrical coefficients as in Equation 2.

In FIG. 9, selecting pixel values from the result that the vertical direction filter arithmetic outputted to the buffer 500, the selector 250 sends pixel values "X0" and "X5" to the adder 211, pixel values "X1" and "X4" to the adder 212, and pixel values "X2" and "X3" to the adder 213.

The filter coefficient "1" is held in the flip-flop 260, and the multiplier 214 multiplies the output "1" of the flip-flop 260 by the output "X0+X5" of the adder 211, and sends the multiplication result "X0+X5" to the adder 217.

The filter coefficient "−5" is held at the flip-flop 270, and the multiplier 215 multiplies the output "−5" of the flip-flop 270 by the output "X1+X4" of the adder 212, and sends the multiplication result "(−5)*(X1+X4)" to the adder 217.

The filter coefficient "20" is held in the flip-flop 280, and the multiplier 216 multiplies the output "20" of the flip-flop 280 by the output "X2+X3" of the adder 213, and sends the multiplication result "20*(X2+X3)" to the adder 217. The adder 217 adds the output "X0+X5" of the multiplier 214 to the output "(−5)*(X1+X4)" of the multiplier 215, and outputs the summation result "(X0+X5)−5*(X1+X4)." The adder 218 adds the output "(X0+X5)−5*(X1+X4)" of the adder 217 to the output "20*(X2+X3)" of the multiplier 216, and outputs the summation result "(X0+X5)−5*(X1+X4)+20*(X2+X3)" to the flip-flop 219. This summation result is equal to the right-hand side of Equation 3, and represents the horizontal direction filter arithmetic result "Y." The flip-flop 219 outputs the result of the horizontal direction filter arithmetic "Y."

In the horizontal filtering unit 200, the second filter module (#B) 220, the second filter module (#C) 230, and the second filter module (#D) 240 perform the same operation as the second filter module (#A) 210 mentioned above, in parallel at the same time, but with different sets of the pixel values selected by the selector 250.

Next, the operation of the horizontal filtering unit 200 is explained according to the timing chart, shown in FIG. 8, of the two-dimensional filter arithmetic device of the present embodiment.

At clock 6, the pixel value "Y0" as the vertical filtering output, i.e., the pixel values of the row series of half pels "H20-H28", are sent from the vertical filtering unit 100 to the buffer 500.

At clock 7, the selector 250 selects the pixel values of the row series of half pels "H20-H28" stored in the buffer 500 as described below, and sends them to the second filter modules (#A) 210-(#D) 240.

Namely, the selector 250 selects the pixel values of half pels H20-H25 as pixel values X0-X5, and sends them to the second filter module (#A) 210; selects the pixel values of half pels H21-H26 as pixel values X0-X5, and sends them to the second filter module (#B) 220; selects the pixel values of half pels H22-H27 as pixel values X0-X5, and sends them to the second filter module (#C) 230; and selects the pixel values of half pels H23-H28 as pixel values X0-X5, and sends them to the second filter module (#D) 240.

The second filter module (#A) 210 performs the product-sum operation of the inputted pixel values and filter coefficients, calculates a pixel value Z0, and sends it to the flip-flop 219.

At the following clock 8, the second filter module (#A) 210 outputs the pixel value "Z0" as a pixel value of half pel Ha.

In a similar manner, at clock 8, the second filter module (#B) 220 outputs the pixel value "Z0" as a pixel value of half pel Hb, the second filter module (#C) 230 outputs the pixel value "Z0" as a pixel value of half pel He, and the second filter module (#D) 240 outputs the pixel value "Z0" as a pixel value of half pel Hd.

In this way, at clock 8, the horizontal filtering output "Z0" can be obtained and the pixel values of half pels Ha, Hb, He, and Hd are outputted in parallel from the second filter modules (#A) 210-(#D) 240, respectively.

At clock 8, the selector 250 selects the pixel values of the row series of half pels "H30-H38" stored in the buffer 500, and sends them to the second filter modules (#A) 210-(#D) 240.

At clock 9, the second filter modules (#A) 210-(#D) 240 calculate a horizontal filtering output "Z1", and output the pixel values of half pels He, Hf, Hg, and Hh in parallel, respectively.

At clock 9, the selector 250 selects the pixel values of the row series of half pels "H40-H48" stored in the buffer 500, and sends them to the second filter modules (#A) 210-(#D) 240.

At clock 10, the second filter modules (#A) 210-(#D) 240 calculate a horizontal filtering output "Z2", and output the pixel values of half pels Hi, Hj, Hk, and Hm in parallel, respectively.

At clock 10, the selector 250 selects the pixel values of the row series of half pels "H50-H58" stored in the buffer 500, and sends them to the second filter modules (#A) 210-(#D) 240.

At clock 11, the second filter modules (#A) 210-(#D) 240 calculate a horizontal filtering output "Z3", and output the pixel values of half pels Hn, Hp, Hq, and Hr in parallel, respectively.

As explained above, in the two-dimensional filter arithmetic device of the present embodiment, the vertical filtering unit 100 and the horizontal filtering unit 200 adopt different parallel-processing systems, and practice the two-dimensional filter arithmetic according to the timing chart illustrated in FIG. 8. Consequently, the two-dimensional filter arithmetic devices of the present embodiment can calculate half pels Ha-Hr in 13 cycles of the clock, using the full pels F00-F88. This processing cycle is improved by about 10% or more, compared with that of the conventional two-dimensional filter arithmetic device. In the place where the sign "*" is illustrated in FIG. 8, the filter arithmetic can be practiced for the generation of pixel values of half pels Ha-Hr belonging to the following picture area B. Therefore, the two-dimensional filter arithmetic device of the present embodiment can improve the effectual processing cycle much more.

In the two-dimensional filter arithmetic device of the present embodiment, the vertical filtering unit 100 practices in-loop pipeline processing (namely, sequential arithmetic processing), as one parallel-processing system (FIG. 6), and the horizontal filtering unit 200 practices in-loop parallel processing (namely, parallel arithmetic processing), as the other parallel-processing system (FIG. 9).

Although the symmetrical 6-tap filter is used for the two-dimensional filter arithmetic device of the present embodiment, a tap filter is not limited to this example.

For example, when the horizontal filtering unit 200 uses an asymmetrical 4-tap filter, it is sufficient that the horizontal filtering unit 200 adds a multiplier, an adder, and a flip-flop, in the block diagram as shown in FIG. 9. Furthermore, the horizontal filtering unit 200 can also increase the degree of parallelism of the in-loop parallel processing, in order to respond an asymmetrical tap filter or a tap filter of six or more taps. Similarly, the vertical filtering unit 100 can change the structure of the processor elements PE10-PE40, according to the structure of a filter to be adopted.

In the two-dimensional filter arithmetic device of the present embodiment, if the standard, to which the processing-target picture data conforms, is decided beforehand, the multipliers which the vertical filtering unit 100 and the horizontal filtering unit 200 possess may be replaced with shifters and adders.

When clipping processing is required after the vertical direction filter arithmetic, it is sufficient just to insert a clipping arithmetic circuit in each output terminal of the processor elements PE10-PE40, in the first filter modules (#0) 110-(#8) 190 of the vertical filtering unit 100.

In the two-dimensional filter arithmetic device of the present embodiment, the vertical filtering unit 100 performs nine-fold parallel processing using the first filter modules (#0) 110 to (#8) 190, and the horizontal filtering unit 200 performs four-fold parallel processing using the second filter modules (#A) 210 to (#D) 240. However, the degree of parallelism of the parallel processing which the vertical filtering unit 100 and the horizontal filtering unit 200 adopt may be suitably changed according to the purpose of usage. For example, it may be allowed to provide such structure in which the vertical filtering unit 100 uses a plurality of first filter modules and the horizontal filtering unit 200 uses one second filter module. Even in this structure, it is possible to realize a two-dimensional filter arithmetic device which suits the purpose of usage, without requiring a buffer for absorbing the difference in the filtering direction.

As described above, the two-dimensional filter arithmetic device of the present embodiment practices the vertical direction filtering and the horizontal direction filtering, by mutually different parallel-processing systems (sequential arithmetic processing and parallel arithmetic processing). Therefore, the two-dimensional filter arithmetic device of the present embodiment can practice the vertical direction filter processing and the horizontal direction filter processing continuously, without using a buffer required by the conventional art for absorbing the difference in the filtering direction (the buffer 500 of the present embodiment is inserted only for timing adjustment). Consequently, the two-dimensional filter arithmetic device of the present embodiment can practice two-dimensional filter arithmetic at high speed, and, furthermore, can reduce the circuit area.

Embodiment 2

Figure 10:
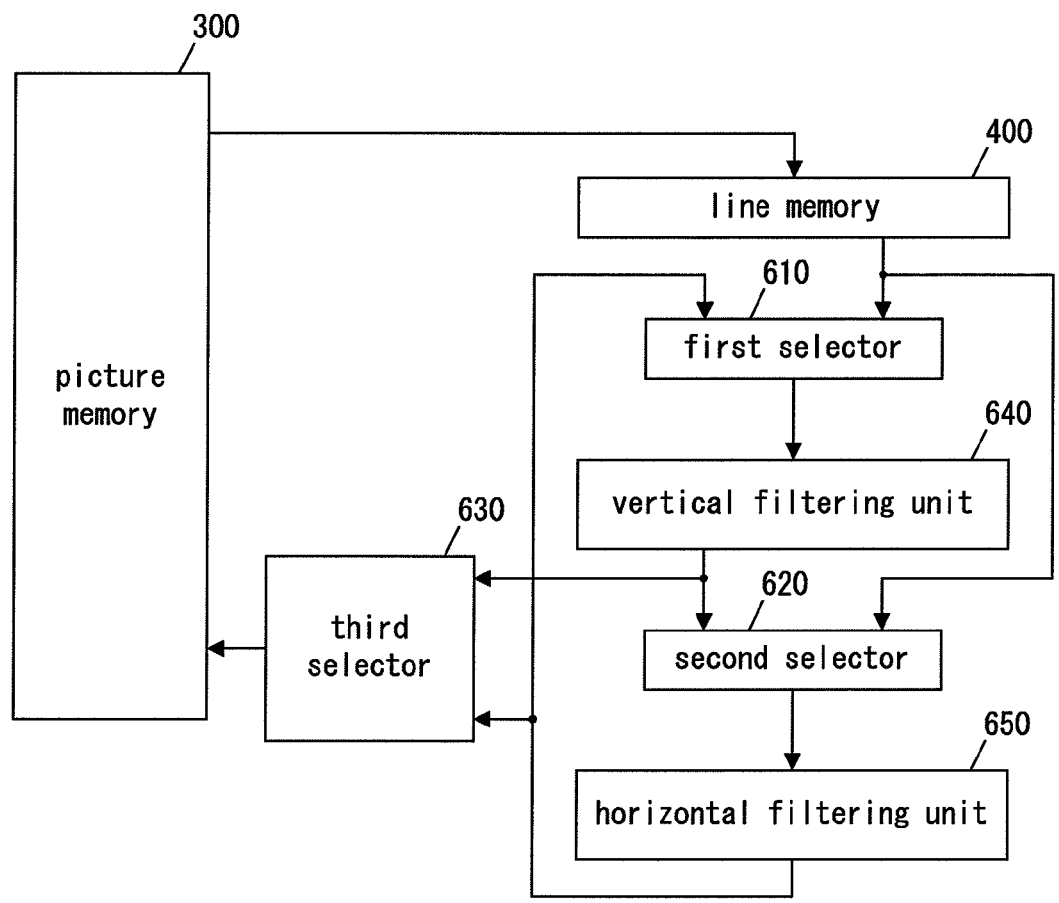
FIG. 10 is a block diagram illustrating a two-dimensional filter arithmetic device in Embodiment 2 of the present invention.

FIG. 10 is a block diagram illustrating a two-dimensional filter arithmetic device in Embodiment 2 of the present invention. The two-dimensional filter arithmetic device according to the present embodiment comprises a picture memory 300, a line memory 400, a vertical filtering unit 640, a horizontal filtering unit 650, a first selector 610, a second selector 620, and a third selector 630.

The two-dimensional filter arithmetic device of the present embodiment possesses two operation modes. Namely, in the case of the first operation mode, the vertical direction filter arithmetic is practiced first, and the horizontal direction filter arithmetic is practiced next. In the case of the second operation mode, the horizontal direction filter arithmetic is practiced first, and the vertical direction filter arithmetic is practiced next. Namely, the two-dimensional filter arithmetic device of the present embodiment can change arbitrarily the sequence of the vertical direction filter arithmetic and the horizontal direction filter arithmetic by switching the operation mode. This scheme is provided to make the two-dimensional filter arithmetic device of the present embodiment corresponding flexibly to the standard which has restrictions of performing the filter processing in the horizontal direction first without exception, like MPEG-4 ASP (Advanced Simple Profile).

First, the first operation mode is explained. In the first operation mode, the two-dimensional filter arithmetic device of the present embodiment practices the vertical direction filter arithmetic first. The first selector 610 selects the output of the line memory 400, the second selector 620 selects the output of the vertical filtering unit 640, and the third selector 630 selects the output of the horizontal filtering unit 650.

The vertical filtering unit 100 illustrated in FIG. 6 and the horizontal filtering unit 200 illustrated in FIG. 9, both explained in Embodiment 1 of the present invention, can be used for the vertical filtering unit 640 and the horizontal filtering unit 650, respectively. The buffer 500 is included in the horizontal filtering unit 650 as a part of the selector 250.

According to the structure, the two-dimensional filter arithmetic device of the present embodiment can perform the vertical direction filter arithmetic first to calculate the pixel values of half pels H20-H58 as illustrated in FIG. 1, and next can perform the horizontal direction filter arithmetic to calculate the pixel values of half pels Ha-Hr as illustrated in FIG. 3. The steps of processing in the first mode of the two-dimensional filter arithmetic device of the present embodiment are the same as the steps of the processing in the two-dimensional filter arithmetic device of Embodiment 1 of the present invention. Therefore, it is possible to calculate the half pels Ha-Hr using the full pels F00-F88, in 13 cycles of the clock.

Next, the second operation mode is explained. In the second operation mode, the two-dimensional filter arithmetic device of the present embodiment practices the horizontal direction filter arithmetic first. The first selector 610 selects the output of the horizontal filtering unit 650, the second selector 620 selects the output of the line memory 400, and the third selector 630 selects the output of the vertical filtering unit 640.

Figure 11:
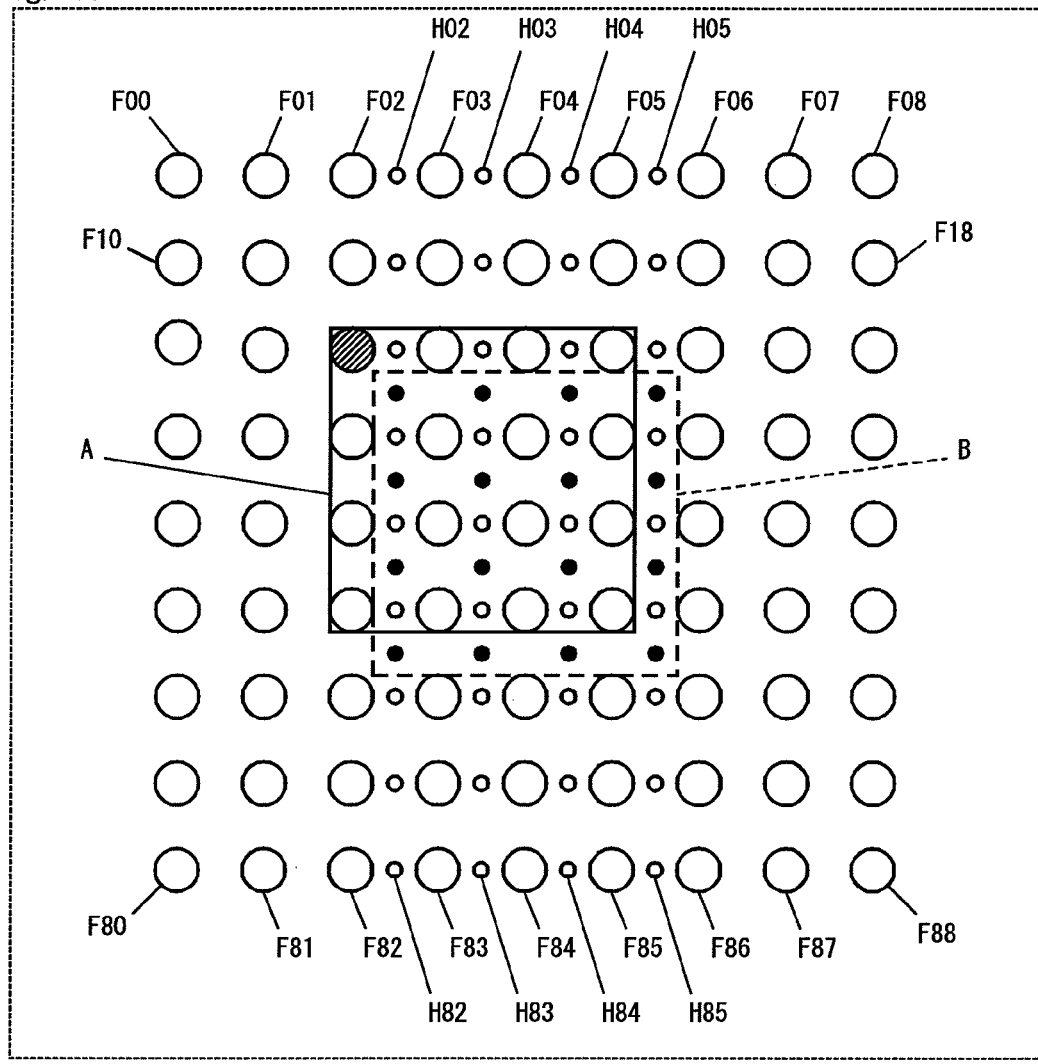
FIG. 11 is a location diagram illustrating full pels and half pels in Embodiment 2 of the present invention.

FIG. 11 is a location diagram illustrating full pels and half pels in Embodiment 2 of the present invention. FIG. 11 is an explanatory drawing illustrating the procedure of the generation of pixel values in the second operation mode. As in Embodiment 1 of the present invention illustrated in FIG. 1, the two-dimensional filter arithmetic device of the present embodiment generates the pixel values of half pels Ha-Hr (refer to FIG. 3 for the symbols) which compose the picture area B, encompassed with the dashed-line rectangle, which is translated from the picture area A, encompassed with the solid-line rectangle, according to a motion vector (½, ½).

In the case of the second operation mode, as illustrated in FIG. 11, first, the horizontal direction filter arithmetic generates the pixel values of half pels H02-H85 using the pixel values of full pels F00-F88; next, the vertical direction filter arithmetic generates the pixel values of half pels Ha-Hr using the pixel values of half pels H02-H85.

The vertical filtering unit 100 illustrated in FIG. 6 and the horizontal filtering unit 200 illustrated in FIG. 9, both explained in Embodiment 1 of the present invention, can be used for the vertical filtering unit 640 and the horizontal filtering unit 650 of FIG. 10, respectively. The buffer 500 may be omitted. In that case, the selector 250 should input pixel values in parallel from the line memory 400. Also the line memory 400 of FIG. 6 may be omitted. In that case, the first filter modules (#0) 110-(#8) 190 should input, in parallel via the first selector 610, the pixel values Z0-Z3 which are generated by the horizontal filtering unit 200.

In the second operation mode, the horizontal filtering unit 200 reads the pixel values of a row series of integer pixels "F00-F08" from the line memory 400, and generates the pixel values of half pels H02-H05. Subsequently, the horizontal filtering unit 200 reads the pixel values of a row series of integer pixels "F10-F18" from the line memory 400, and generates the pixel values of half pels H12-H15. Similarly in the following, up to the last row, the horizontal filtering unit 200 generates the pixel values of the half pels of the small white circles as illustrated in FIG. 11, four half pels per line in parallel up to the half pels H82-H85.

The pixel values of four pixels of each row of the row series of half pels "H02-H05", "H12-H15" ... "H82-H85", which have been generated in parallel by the horizontal filtering unit 200, are inputted in parallel in each of the processor elements PE10-PE40 of the first filter modules (#0) 110-(#3) 130 (not shown) of the vertical filtering unit 100.

The first filter module (#0) 110 of the vertical filtering unit 100 generates the pixel values of half pels Ha, He, Hi, and Hn, using the pixel values of the column series of half pels "H02-H82" illustrated in FIG. 11. The first filter module (#1) 120 generates the pixel value of half pels Hb, Hf, Hj, and Hp, using the pixel values of the column series of half pels "H03-H83." The first filter module (#2) 130 (not shown) generates the pixel values of half pels Hc, Hg, Hk, and Hq, using the pixel values of the column series of half pels "H04-H84." The first filter module (#3) 140 (not shown) generates the pixel values of half pels Hd, Hh, Hm, and Hr, using the pixel values of the column series of half pels "H05-H85." The first filter modules (#4) (not shown) to the first filter module (#8) 190 are not used.

By the above processing, the pixel values of all half pels Ha-Hr that define the picture area B can be obtained.

The flow of processing in the second operation mode of the two-dimensional filter arithmetic device of the present embodiment is explained in more detail according to a timing chart.

FIG. 12 is a timing chart of the two-dimensional filter arithmetic device (the second operation mode) in Embodiment 2 of the present invention. The timing chart of FIG. 12 is explained with reference to FIG. 6 and FIGS. 9, 10, and 11.

In the second operation mode, picture data are inputted from the line memory 400 to the selector 250 of the horizontal filtering unit 200, and the output of the horizontal filtering unit 200 is inputted into the vertical filtering unit 100.

At clock 0, a pixel value "Y0" (pixel values of full pels F00-F08) is inputted from the line memory 400 to the horizontal filtering unit 200. Namely, via the selector 250, the pixel values of full pels F00-F05 are inputted into the second filter module (#A) 210, the pixel values of full pels F01-F06 are inputted into the second filter module (#B) 220, the pixel values of full pels F02-F07 are inputted into the second filter module (#C) 230, and the pixel values of full pels F03-F08 are inputted into the second filter module (#D) 240. Each module (#A-#D) practices the product-sum operation (Equation 3) of the inputted pixel values and filter coefficients. The filter coefficients are fed from the flip-flops 260, 270, and 280.

At clock 1, the horizontal filtering unit 200 outputs the pixel value "Z0" to which the horizontal filtering unit 200 performed the horizontal direction filtering. Namely, the second filter module (#A) 210 outputs the pixel value of half pel H02 generated from the pixel values of full pels F00-F05, the second filter module (#B) 220 outputs the pixel value of half pel H03 generated from the pixel values of full pels F01-F06, the second filter module (#C) 230 outputs the pixel value of half pel H04 generated from the pixel values of full pels F02-F07, and the second filter module (#D) 240 outputs the pixel value of half pel H05 generated from the pixel values of full pels F03-F08.

At the same time at clock 1, a pixel value "Y1" (pixel values of full pels F10-F18) is inputted from the line memory 400 to the horizontal filtering unit 200. Namely, via the selector 250, the pixel values of full pels F10-F15 are inputted into the second filter module (#A) 210, the pixel values of full pels F11-F16 are inputted into the second filter module (#B) 220, the pixel values of full pels F12-F17 are inputted into the second filter module (#C) 230, and the pixel values of full pels F13-F18 are inputted into the second filter module (#D) 240, Each module (#A-#D) practices the product-sum operation (Equation 3) of the inputted pixel values and the filter coefficients. The filter coefficients are fed from the flip-flops 260, 270, and 280.

At clock 2, the horizontal filtering unit 200 outputs the pixel value "Z1" to which the horizontal filtering unit 200 performed the horizontal direction filtering. Namely, the second filter module (#A) 210 outputs a pixel value of half pel H12, the second filter module (#B) 220 outputs a pixel value of half pel H13, the second filter module (#C) 230 outputs a pixel value of half pel H14, and the second filter module (#D) 240 outputs a pixel value of half pel H15.

At the same time at clock 2, a pixel value "Y3" (pixel values of full pels F20-F28) is inputted from the line memory 400 to the horizontal filtering unit 200. At the subsequent clocks up to clock 9, the similar processing is sequentially performed.

On the other hand, in the vertical filtering unit 100, at clock 2, the pixel value "Z0"outputted from the horizontal filtering unit 200 at clock 1 is inputted into the pixel-data-input-terminal in0 of the processor element PE 10 of the vertical filtering unit 100, as a pixel value "X0", and the product-sum operation is practiced between the pixel value "X0" and the filter coefficient "a". The filter coefficient "a" is inputted into the coefficient input terminal inA of the processor element PE 10 from the coefficient input terminal 91. Namely, the pixel value of half pel H02 is inputted into the pixel-data-input-terminal in0 of the processor element PE 10 of the first filter module (#0) 110, the pixel value of half pel H03 is inputted into the pixel-data-input-terminal in0 of the processor element PE 10 of the first filter module (#1) 120, the pixel value of half pel H04 is inputted into the pixel-data-input-terminal in0 of the processor element PE 10 of the first filter module (#2) (not shown), and the pixel value of half pel H05 is inputted into the pixel-data-input-terminal in0 of the processor element PE 10 of the first filter module (#3) (not shown). The first filter modules (#4) (not shown)-(#8) 190 are not used.

At clock 3, the pixel value "Z1" outputted from the horizontal filtering unit 200 is inputted into the processor element PE 10 as a pixel value "X1", and the product-sum operation is practiced between the pixel value "X1" and the filter coefficient "b" inputted from the coefficient input terminal 91. At the same time, the pixel value "Z1" outputted from the horizontal filtering unit 200 is inputted into the processor element PE 20 as the pixel value "X1", and the product-sum operation is practiced between the pixel value "X1" and the filter coefficient "a" inputted from the processor element PE 10. Namely, in the first filter module (#0) 110, the pixel value of half pel H12 is inputted to the pixel-data-input-terminal in0 of the processor element PE 10 and to the pixel-data-input-terminal in1 of the processor element PE 20. In the first filter module (#1) 120, the pixel value of half pel H13 is inputted to the pixel-data-input-terminal in0 of the processor element PE 10, and to the pixel-data-input-terminal in1 of the processor element PE 20. In the first filter module (#2) (not shown), the pixel value of half pel H14 is inputted to the pixel-data-input-terminal in0 of the processor element PE 10, and to the pixel-data-input-terminal in1 of the processor element PE 20. In the first filter module (#3) (not shown), the pixel value of half pel H15 is inputted to the pixel-data-input-terminal in0 of the processor element PE 10, and to the pixel-data-input-terminal in1 of the processor element PE 20. The product-sum operation is practiced in each processor element PE.

Similarly in the following, in the processor elements PE10-PE40 of the first filter modules (#0) 110-(#3) (not shown), the similar product-sum operation is practiced and the vertical filtering unit 100 outputs a pixel value "Y0" at clock 8. Namely, the first filter module (#0) 110 outputs the pixel value of half pel Ha, the first filter module (#1) 120 outputs the pixel value of half pel Hb, the first filter module (#2) (not shown) outputs the pixel value of half pel Hc, and the first filter module (#3) (not shown) outputs the pixel value of the half pel Hd.

At clock 9, the vertical filtering unit 100 outputs a pixel value "Y1" (pixel values of half pels He-Hh).

At clock 10, the vertical filtering unit 100 outputs a pixel value "Y2" (pixel values of half pels Hi-Hm).

At clock 11, the vertical filtering unit 100 outputs a pixel value "Y3" (pixel values of half pels Hn-Hr).

As explained above, the two-dimensional filter arithmetic device of the present embodiment practices the two-dimensional filter arithmetic following the timing chart as illustrated in FIG. 12, in order of the horizontal direction filtering and the vertical direction filtering. Consequently, also in the second operation mode, the two-dimensional filter arithmetic devices of the present embodiment can obtain the half pels Ha-Hr using the full pels F00-F88, in 13 cycles of the clock. This processing cycle is equal to the processing cycle in the first operation mode. Therefore, the two-dimensional filter arithmetic device of the present embodiment can practice the two-dimensional filtering, at the processing speed which is improved about 10% or more compared with the conventional two-dimensional filter arithmetic device, in both of the first operation mode and the second operation mode.

The two-dimensional filter arithmetic device of the present embodiment, in the first operation mode, practices the vertical direction filter arithmetic first, and practices the horizontal direction filter arithmetic next, thereby completing the two-dimensional filter arithmetic; and in the second operation mode, it practices the horizontal direction filter arithmetic first, and practices the vertical direction filter arithmetic next, thereby completing the two-dimensional filter arithmetic. Therefore, according to the two-dimensional filter arithmetic device of the present embodiment, the sequence of the horizontal direction filter arithmetic and the vertical direction filter arithmetic can be easily changed by selecting the operation mode according to the standard on which the picture data to be processed are based.

Embodiment 3

FIG. 13 is a block diagram illustrating a semiconductor integrated circuit in Embodiment 3 of the present invention. The semiconductor integrated circuit 700 according to the present embodiment comprises a two-dimensional filter arithmetic unit 710, CPU 720, an encoding/decoding unit 730, a memory 740, and a functional circuit unit 750. The two-dimensional filter arithmetic unit 710 includes a vertical filtering unit 711 and a horizontal filtering unit 712.

The two-dimensional filter arithmetic unit 710 of the present embodiment corresponds to the two-dimensional filter arithmetic device which is illustrated in FIG. 4 and was explained in Embodiment 1 of the present invention. Namely, the vertical filtering unit 711 of the present embodiment includes the vertical filtering unit 100 and the line memory 400, shown in FIG. 4. The horizontal filtering unit 712 of the present embodiment includes the horizontal filtering unit 200 and the buffer 500, shown in FIG. 4.

To picture data to be filtered, the two-dimensional filter arithmetic unit 710 performs two-dimensional filtering, and generates the pixel value of a new pixel.

The encoding/decoding unit 730 performs variable length encoding of the motion picture, and outputs the encoded picture data. Also, the encoding/decoding unit 730 performs the variable length decoding of encoded picture data, and outputs the decoded picture.

In the generation of a predicted picture by motion compensated prediction in encoding of a motion picture, and in the generation of a motion compensated picture based on a motion vector in decoding of encoded picture data, the encoding/decoding unit 730 performs the two-dimensional filtering using the two-dimensional filter arithmetic unit 710, and interpolates the pixels of the predicted picture or the motion compensated picture.

The memory 740 corresponds to the picture memory 300, and stores picture data.

The functional circuit unit 750 is a circuit section which includes functions other than the functions of the two-dimensional filter arithmetic unit 710 and the encoding/decoding unit 730.

The two-dimensional filtering in the two-dimensional filter arithmetic unit 710 of the present embodiment is the same as processing by the two-dimensional filter arithmetic device of Embodiment 1 of the present invention. Namely, to the picture data to be filtered, stored in the memory 740, the two-dimensional filter arithmetic unit 710 performs vertical direction filtering, subsequently performs horizontal direction filtering (or in the reverse sequence), and generates the picture data after the motion compensated prediction. The details of operation of the two-dimensional filter arithmetic unit 710 are the same as the two-dimensional filter arithmetic device of Embodiment 1 of the present invention. Therefore, the explanation thereof is omitted.

CPU 720 performs processing other than the encoding/decoding processing which is performed by the encoding/decoding unit 730, and other than the processing which is performed by the functional circuit unit 750. At the same time, CPU 720 performs control of the entire semiconductor integrated circuit 700.

In the semiconductor integrated circuit 700 of the present embodiment, the two-dimensional filter arithmetic unit 710 does not require a buffer for absorbing the difference in the filtering direction of the two-dimensional filter arithmetic processing. Therefore, the semiconductor integrated circuit 700 can be realized with a circuit area smaller than before, and also with suppressed power consumption.

In addition to the above description, in the semiconductor integrated circuit 700 of the present embodiment, it is assumed that the encoding/decoding unit 730 performs encoding/decoding processing. However, CPU 720 may process encoding/decoding processing with software. In that case, the encoding/decoding unit 730 can be omitted from the semiconductor integrated circuit 700.

The semiconductor integrated circuit 700 of the present embodiment comprises a memory 740 as one of the internal elements. However, the semiconductor integrated circuit 700 may use a memory which is externally and separately arranged. In that case, the memory 740 can be omitted from the semiconductor integrated circuit 700.

The semiconductor integrated circuit 700 of the present embodiment is suitably applied to electronic equipment treating motion picture data, such as a mobile phone, a DVD recorder, an HDD recorder, a television set, and others.

Embodiment 4

Figure 14:
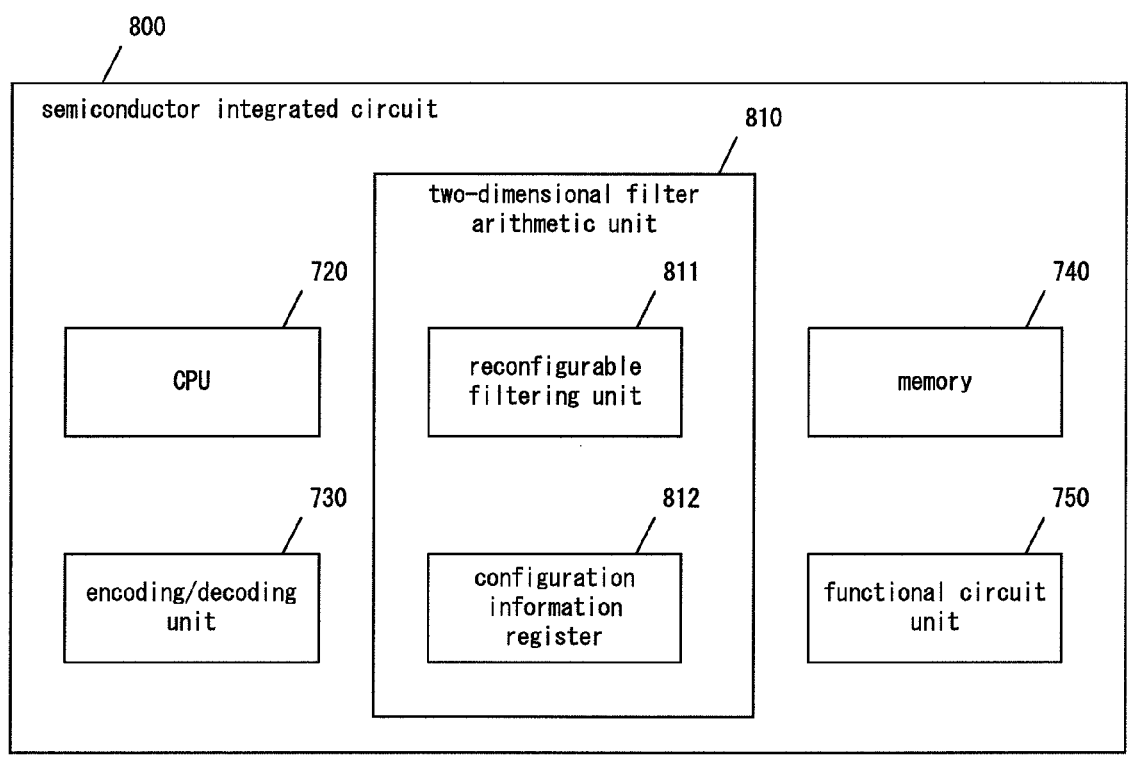
FIG. 14 is a block diagram illustrating a semiconductor integrated circuit in Embodiment 4 of the present invention.

FIG. 14 is a block diagram illustrating a semiconductor integrated circuit in Embodiment 4 of the present invention. In FIG. 14, the same components as those in FIG. 13 are attached with the same reference symbols or numerals and the descriptions thereof are omitted.

The semiconductor integrated circuit 800 of the present embodiment illustrated in FIG. 14 possesses the almost same structure as the semiconductor integrated circuit 700 of Embodiment 3 of the present invention illustrated in FIG. 13. However, the two-dimensional filter arithmetic unit 810 is different. Namely, the two-dimensional filter arithmetic unit 810 of the present embodiment includes a reconfigurable filtering unit 811 and a configuration information register 812.

The reconfigurable filtering unit 811 comprises a reconfigurable logic, and can reconfigure dynamically a two-dimensional filter circuit which corresponds to the two-dimensional filter arithmetic device illustrated in FIG. 10 of Embodiment 2 of the present invention, according to the configuration information stored in the configuration information register 812.

The configuration information stored in the configuration information register 812 includes at least two pieces of configuration information, i.e., first configuration information and second configuration information.

The two-dimensional filter arithmetic unit 810 includes two operation modes, i.e., a first operation mode and a second operation mode.

When the first operation mode is selected, the reconfigurable filtering unit 811 is reconfigured according to the first configuration information stored in the configuration information register 812, and is set to practice the vertical direction filter arithmetic first and subsequently practice the horizontal direction filter arithmetic, to the picture data to be filtered, stored in the memory 740. Consequently, the reconfigurable filtering unit 811, in the first operation mode, can carry out the same function as the function in the first operation mode of the two-dimensional filter arithmetic device in Embodiment 2 of the present invention.

When the second operation mode is selected, the reconfigurable filtering unit 811 is reconfigured according to the second configuration information stored in the configuration information register 812, and is set to practice the horizontal direction filter arithmetic first and subsequently practice the vertical direction filter arithmetic, to the picture data to be filtered, stored in the memory 740. Consequently, the reconfigurable filtering unit 811, in the second operation mode, can carry out the same function as the function in the second operation mode of the two-dimensional filter arithmetic device in Embodiment 2 of the present invention.

In the generation of a predicted picture by motion compensated prediction in encoding of a motion picture, and in the generation of a motion compensated picture based on a motion vector in decoding of encoded picture data, the encoding/decoding unit 730 performs the two-dimensional filtering using the two-dimensional filter arithmetic unit 810, and interpolates the pixels of the predicted picture or the motion compensated picture.

CPU 720 performs processing other than the encoding/decoding processing which is performed by the encoding/decoding unit 730 and other than the processing which is performed by the functional circuit unit 750. At the same time, CPU 720 performs control of the entire semiconductor integrated circuit 800.

In the semiconductor integrated circuit 800 of the present embodiment, the two-dimensional filter arithmetic unit 810 does not require a buffer for absorbing the difference in the filtering direction of the two-dimensional filter arithmetic processing. The semiconductor integrated circuit 800 of the present embodiment can change the sequence of the horizontal direction filtering and the vertical direction filtering, dynamically and easily, by selecting the operation mode corresponding to the standard which is followed by the picture data.

In addition to the above description, the configuration information stored in the configuration information register 812 may include configuration information other than the first configuration information and the second configuration information. In that case, it is possible to realize two-dimensional filter arithmetic using a tap filter with the number of taps other than 6, or two-dimensional filter arithmetic using a filter with asymmetrical filter coefficients.

In addition to the above description, in the semiconductor integrated circuit 800 of the present embodiment, it is assumed that the encoding/decoding unit 730 performs encoding/decoding processing. However, CPU 720 may process encoding/decoding processing with software. In that case, the encoding/decoding unit 730 can be omitted from the semiconductor integrated circuit 800.

The semiconductor integrated circuit 800 of the present embodiment comprises a memory 740 as one of the internal elements. However, the semiconductor integrated circuit 800 may use a memory which is arranged externally and separately. In that case, the memory 740 can be omitted from the semiconductor integrated circuit 800.

The semiconductor integrated circuit 800 of the present embodiment is suitably applied to electronic equipment treating motion picture data, such as a mobile phone, a DVD recorder, an HDD recorder, a television set, and others.

Embodiment 5

Figure 15:
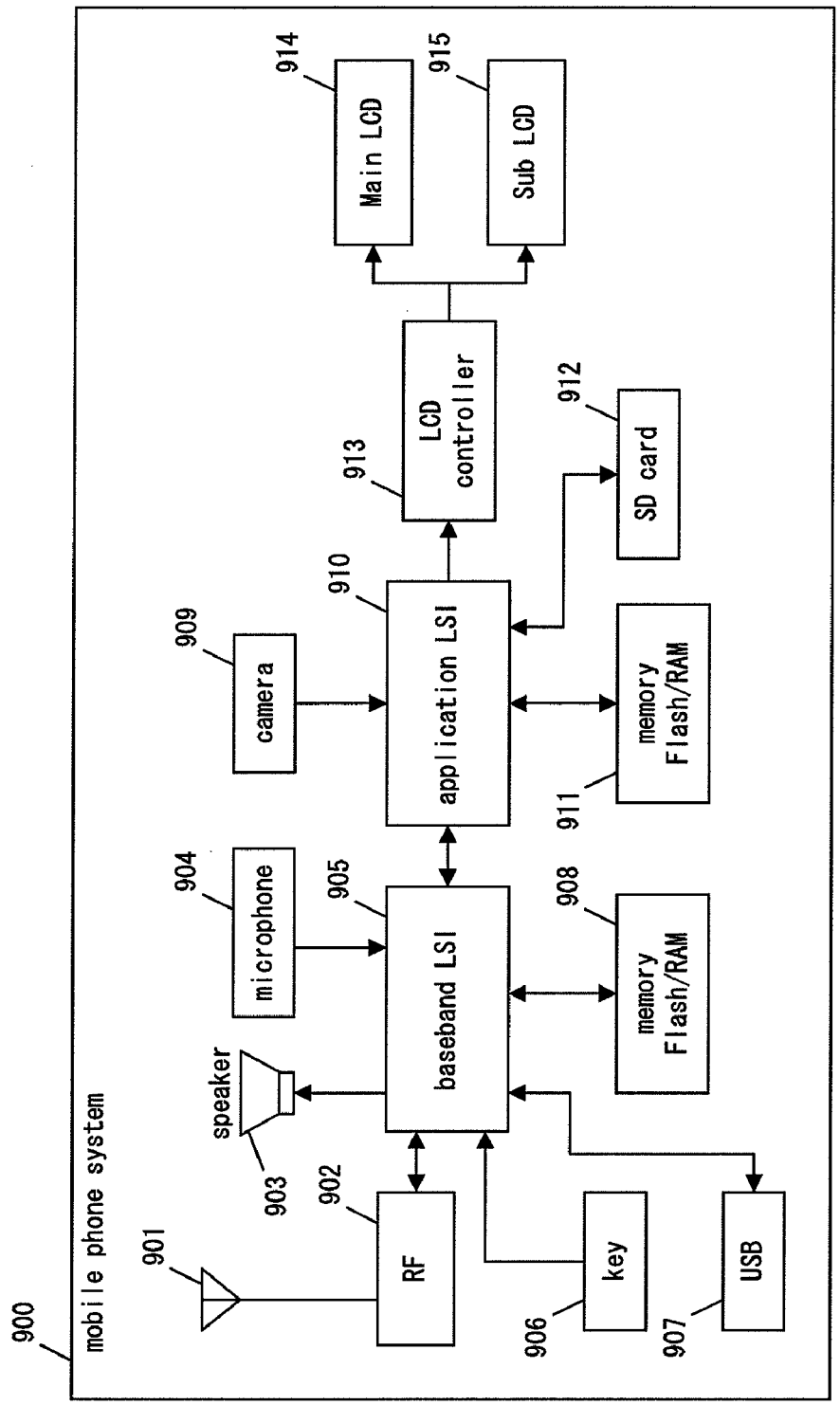
FIG. 15 is a block diagram illustrating electronic equipment in Embodiment 5 of the present invention.
Figure 16:
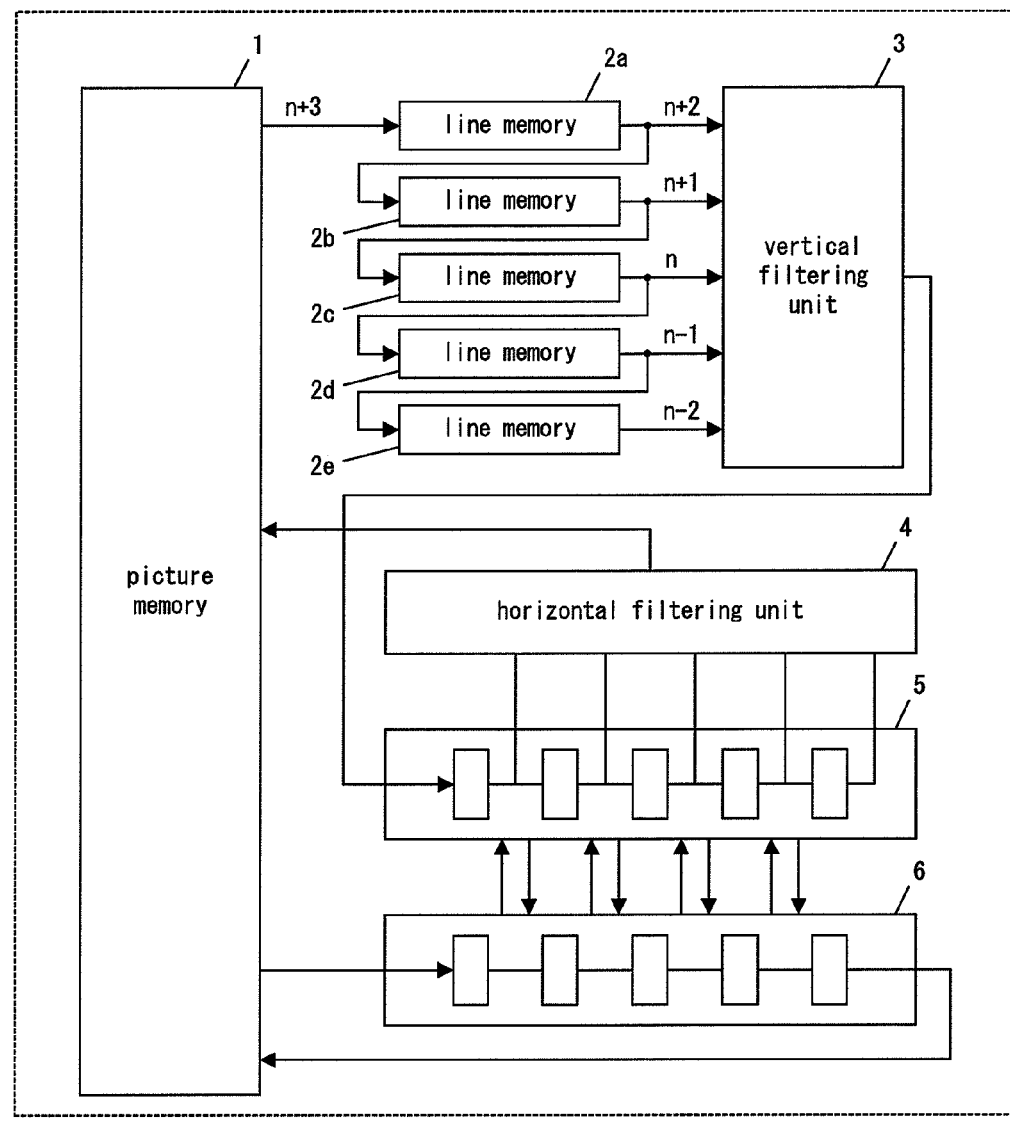
FIG. 16 is a block diagram illustrating the conventional two-dimensional filter.

FIG. 15 is a block diagram illustrating a mobile phone system 900 in Embodiment 5 of the present invention.

The mobile phone system 900 of the present embodiment comprises an antenna 901, RF circuit 902, a baseband LSI 905, a camera 909, an application LSI 910, a memory 911, LCD controller 913, a main LCD 914, and a sub LCD 915, as main components.

Operation of the mobile phone system 900 of the present embodiment is outlined in the following.

RF circuit 902 performs communication with the other end user's mobile phone of the outside, by transmitting and receiving the picture and/or text data in bit streams. RF circuit 902 also receives picture data from the Internet.

The baseband LSI 905 mainly performs communications processing.

The application LSI 910 performs processing of picture data. The semiconductor integrated circuit 700 of Embodiment 3 of the present invention or the semiconductor integrated circuit 800 of Embodiment 4 can be suitably used for the application LSI 910.

Since the application LSI 910 is provided externally with the memory 911 which stores picture data to be filtered, the semiconductor integrated circuit 700 or the semiconductor integrated circuit 800, used for the application LSI 910, may not possess an internal memory which stores the picture data to be filtered.

The main LCD 914 displays picture data, text data, etc. which are processed by the application LSI 910 under control of LCD controller 913. The sub LCD 915 mainly displays text data under control of LCD controller 913.

In the mobile phone system 900 of the present embodiment, picture data which RF circuit 902 received from the other end user's mobile phone via the antenna 901, or picture data received from the Internet, is once processed by the baseband LSI 905, and decoded by the application LSI 910. The decoded picture is displayed on the main LCD 914. On the contrary, the picture shot with the camera 909 is processed by the application LSI 910 and displayed on the main LCD 914. The picture is also encoded by the application LSI 910 to generate the encoded picture data. The encoded picture data undergoes the communications processing by the baseband LSI 905, and is transmitted from RF circuit 902 via the antenna 901 to the other end user's mobile phone.

Since the application LSI 910 of the present embodiment employs the semiconductor integrated circuit 700 of Embodiment 3 or the semiconductor integrated circuit 800 of Embodiment 4 of the present invention, the application LSI 910 of the present embodiment can practice efficiently the two-dimensional filtering of the motion compensation in the decoding processing of received picture data, or the two-dimensional filtering of the motion prediction in the encoding processing of pictures shot with the camera. According to the standard of the received picture data, the sequence of the filtering direction of the two-dimensional filtering can be switched easily. Furthermore, the application LSI 910 of the present embodiment can be realized in a circuit area smaller than before. Consequently, the mobile phone system 900 of the present embodiment is suitably realizable, as a device which is small in size and flexible in function.

As mentioned above, the mobile phone system 900 was explained as an example of application as the electronic equipment which uses the semiconductor integrated circuit 700 of Embodiment 3 or the semiconductor integrated circuit 800 of Embodiment 4 of the present invention. However, the electronic equipment which uses the semiconductor integrated circuit 700 or the semiconductor integrated circuit 800, includes the following products, in addition to the mobile phone system 900; a portable information terminal (PDA), a DVD recorder, an HDD recorder, a television set, a car-navigation system, a personal computer with a motion-picture processing function, and others.

Also in these kinds of electronic equipment, processing of picture data can be efficiently practiced by using the semiconductor integrated circuit 700 or semiconductor integrated circuit 800 which possesses the two-dimensional filter arithmetic unit of the present invention.

INDUSTRIAL APPLICABILITY

The two-dimensional filter arithmetic device according to the present invention can be used in a motion picture processing device and others which require picture compression/expansion processing, in-loop filter processing, scanning line conversion processing, or picture smoothing processing, and in the related applicable fields.

The invention claimed is:

1. A two-dimensional filter arithmetic device comprising:
a storage unit operable to store picture data to be filtered;
a first filtering unit operable to perform first filter arithmetic to the picture data to be filtered, the picture data being stored in said storage unit; and
a second filtering unit operable to perform second filter arithmetic to the picture data filtered by said first filtering unit,
wherein said first filtering unit and said second filtering unit perform mutually different filter arithmetic from among vertical direction filter arithmetic and horizontal direction filter arithmetic,
wherein the vertical direction filter arithmetic and the horizontal direction filter arithmetic are performed by mutually different parallel processing,
wherein said first filtering unit comprises a plurality of first filter modules, and said second filtering unit comprises at least one second filter module,
wherein said plurality of first filter modules perform respectively the first filter arithmetic to the picture data to be filtered; thereby, said first filtering unit outputs a plurality of first filtering results,
wherein said at least one second filter module inputs at least part of the plurality of first filtering results to perform the second filter arithmetic; thereby, said second filtering unit outputs at least a second filtering result,
wherein each of said plurality of first filter modules comprises:
a plurality of accumulation units which are composed of a first-stage accumulation unit and at least one latter-stage accumulation unit, each of said plurality of accumulation units being connected in cascade; and
a selecting unit operable to sequentially select the respective outputs of said plurality of accumulation units, wherein predetermined filter coefficients are supplied to said first-stage accumulation unit, sequentially per unit processing time, wherein the predetermined filter coefficients are transferred from said first-stage accumulation unit to said at least one latter-stage accumulation unit, sequentially per unit processing time, wherein pixel values of pixels, aligned horizontally or vertically, of the picture data to be filtered are inputted from said storage unit to each of said plurality of accumulation units, sequentially per unit processing time, and wherein said plurality of accumulation units perform product-sum operation between the pixel values and the predetermined filter coefficients respectively, thereby outputting the plurality of first filtering results.

2. The two-dimensional filter arithmetic device as defined in claim 1, wherein the parallel processing includes sequential arithmetic processing performed, in parallel, to the picture data to be filtered and parallel arithmetic processing performed, in parallel, to the picture data to be filtered.

3. The two-dimensional filter arithmetic device as defined in claim 1, wherein said first filtering unit performs in parallel the first filter arithmetic using said plurality of first filter modules, and wherein when said second filtering unit comprises a plurality of second filter modules, said second filtering unit performs in parallel the second filter arithmetic using said plurality of second filter modules.

4. The two-dimensional filter arithmetic device as defined in claim 1, wherein said at least one second filter module comprises:
a plurality of adding units; and
a plurality of multiplying units, wherein said at least one second filter module performs product-sum operation between at least part of the plurality of first filtering results and the plurality of predetermined filter coefficients, thereby outputting the at least one second filtering result.

5. The two-dimensional filter arithmetic device as defined in claim 1, wherein said plurality of first filter modules perform the first filter arithmetic, following either one of an in-loop pipeline processing system and an in-loop parallel processing system, and wherein said at least one second filter module performs the second filter arithmetic, following either one of the in-loop pipeline processing system and the in-loop parallel processing system, but the one not followed by said plurality of first filter modules.

6. The two-dimensional filter arithmetic device as defined in claim 1, further comprising:

a line memory operable to acquire pixel values of pixels of one line from said storage unit, to store the acquired pixel values of pixels temporally, and to output the temporally-stored pixel values of pixels to said first filtering unit.

7. A two-dimensional filter arithmetic device comprising:
a storage unit operable to store picture data to be filtered;
a vertical filtering unit operable to perform vertical direction filter arithmetic;
a horizontal filtering unit operable to perform horizontal direction filter arithmetic;
a first selecting unit operable to select one of outputs of said storage unit and said horizontal filtering unit, thereby outputting the selected output to said vertical filtering unit;
a second selecting unit operable to select one of outputs of said storage unit and said vertical filtering unit, thereby outputting the selected output to said horizontal filtering unit; and
a third selecting unit operable to select one of outputs of said vertical filtering unit and said horizontal filtering unit, thereby outputting the selected output as a two-dimensional filter arithmetic result, wherein the vertical direction filter arithmetic and the horizontal direction filter arithmetic are performed by mutually different parallel processing, wherein, when a first operation mode is selected, said first selecting unit selects the output of said storage unit, said second selecting unit selects the output of said vertical filtering unit, and said third selecting unit selects the output of said horizontal filtering unit; thereby, the vertical direction filter arithmetic and the horizontal direction filter arithmetic are performed in this order to the picture data to be filtered, the picture data being stored in said storage unit, and wherein, when a second operation mode is selected, said second selecting unit selects the output of said storage unit, said first selecting unit selects the output of said horizontal filtering unit, and said third selecting unit selects the output of said vertical filtering unit; thereby, the horizontal direction filter arithmetic and the vertical direction filter arithmetic are performed in this order to the picture data to be filtered, the picture data being stored in said storage unit.

8. The two-dimensional filter arithmetic device as defined in claim 7, wherein the parallel processing includes sequential arithmetic processing which is performed in parallel, to the picture data to be filtered, and parallel arithmetic processing which is performed in parallel, to the picture data to be filtered.

9. The two-dimensional filter arithmetic device as defined in claim 7, wherein selection between the first operation mode and the second operation mode is made according to a motion picture coding standard to which the picture data to be filtered is pursuant.

* * * * *